US012593325B2

(12) United States Patent
Sun et al.

(10) Patent No.: US 12,593,325 B2
(45) Date of Patent: Mar. 31, 2026

(54) INFORMATION EXCHANGES FOR COORDINATED ACCESS POINT OPERATIONS

(71) Applicant: QUALCOMM Incorporated, San Diego, CA (US)

(72) Inventors: Yanjun Sun, San Diego, CA (US); Abhishek Pramod Patil, San Diego, CA (US); George Cherian, San Diego, CA (US); Abdel Karim Ajami, San Diego, CA (US); Alfred Asterjadhi, San Diego, CA (US); Sai Yiu Duncan Ho, San Diego, CA (US); Gaurang Naik, San Diego, CA (US); Alireza Raissinia, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 326 days.

(21) Appl. No.: 18/336,896

(22) Filed: Jun. 16, 2023

(65) Prior Publication Data
US 2024/0422764 A1 Dec. 19, 2024

(51) Int. Cl.
*H04W 72/12* (2023.01)
*H04W 16/14* (2009.01)
*H04W 72/566* (2023.01)

(52) U.S. Cl.
CPC ........... *H04W 72/12* (2013.01); *H04W 16/14* (2013.01); *H04W 72/566* (2023.01)

(58) Field of Classification Search
CPC ..... H04W 16/14; H04W 72/12; H04W 88/08; H04W 72/566; H04W 72/0446; H04W 74/0816; H04L 5/0035
See application file for complete search history.

(56) References Cited

U.S. PATENT DOCUMENTS

2021/0282161 A1    9/2021   Sun et al.
2022/0312213 A1*   9/2022   Trainin ............... H04W 12/106
(Continued)

FOREIGN PATENT DOCUMENTS

WO    WO-2022132030 A1    6/2022

OTHER PUBLICATIONS

International Search Report and Written Opinion—PCT/US2024/029767—ISA/EPO—Sep. 13, 2024.
(Continued)

*Primary Examiner* — Congvan Tran
(74) *Attorney, Agent, or Firm* — Holland & Hart LLP/Qualcomm

(57) ABSTRACT

This disclosure provides methods, components, devices, and systems that support information exchanges for coordinated access point (CAP) operations. Some aspects more specifically relate to transmitting and receiving CAP-specific parameters to facilitate transmit opportunity (TXOP) sharing between a first access point (AP) and one or more second APs. For example, the first AP (such as a sharing AP) may use CAP-specific parameters provided by the one or more second APs (such as shared APs) to determine a CAP sharing schedule for a TXOP. The CAP-specific parameters may include static capability parameters and dynamic parameters. The static capability parameters may include supported CAP modes, association identifiers (AIDs), and processing times, while the dynamic parameters may include medium access demands, traffic priority information, and service period information. The first AP may advertise the CAP sharing schedule to the one or more second APs via an announcement frame.

38 Claims, 9 Drawing Sheets

(56)                    References Cited

U.S. PATENT DOCUMENTS

| | | | | |
|---|---|---|---|---|
| 2023/0319886 A1* | 10/2023 | Wang | .................... | H04L 5/0035 |
| | | | | 370/329 |
| 2024/0098712 A1* | 3/2024 | Chitrakar | .......... | H04W 72/0446 |
| 2024/0114572 A1* | 4/2024 | Lanante | ................ | H04W 76/15 |
| 2024/0340953 A1* | 10/2024 | Ajami | .............. | H04W 74/0866 |
| 2024/0406995 A1* | 12/2024 | Shafin | .............. | H04W 74/0808 |

OTHER PUBLICATIONS

Verma L (Qualcomm Inc)., et al., "Coordinated AP Time/Frequency Sharing in a Transmit Opportunity in 11be", doc.: IEEE 802.11-19/1582r2, Jan. 14, 2020, pp. 1-15, Nov. 2019, XP093053332, Slide 6.

* cited by examiner

Parameter Indication
Component

625

TXOP Sharing Component

635

SA Response Component

645

CAP Schedule Component

630

Frame Exchange Component

640

Trigger Response Component

650

620

600

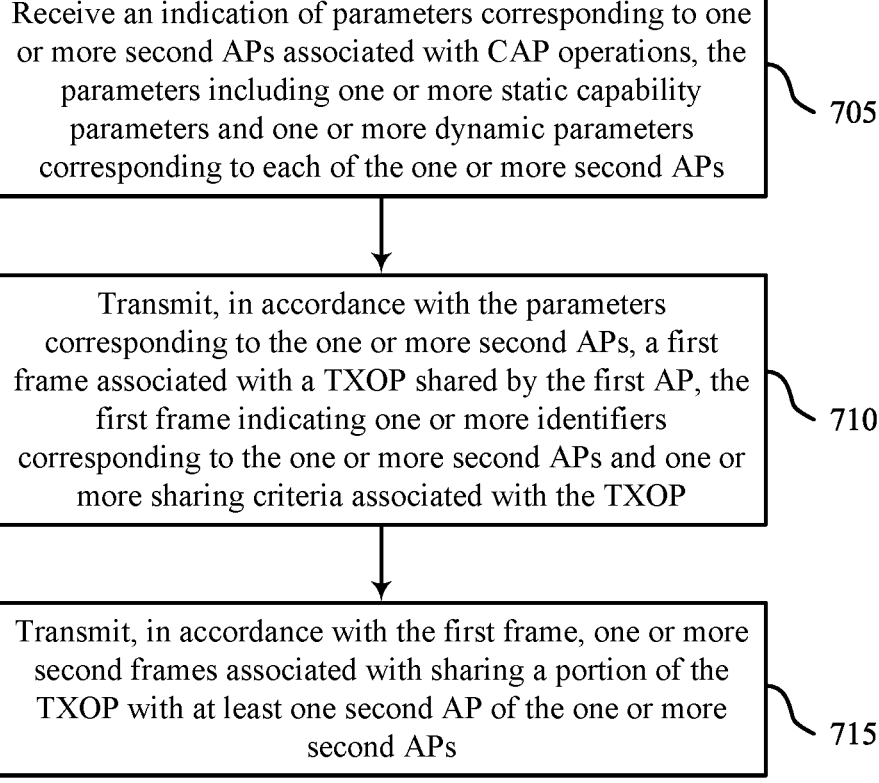

Receive an indication of parameters corresponding to one or more second APs associated with CAP operations, the parameters including one or more static capability parameters and one or more dynamic parameters corresponding to each of the one or more second APs

705

Transmit, in accordance with the parameters corresponding to the one or more second APs, a first frame associated with a TXOP shared by the first AP, the first frame indicating one or more identifiers corresponding to the one or more second APs and one or more sharing criteria associated with the TXOP

710

Transmit, in accordance with the first frame, one or more second frames associated with sharing a portion of the TXOP with at least one second AP of the one or more second APs

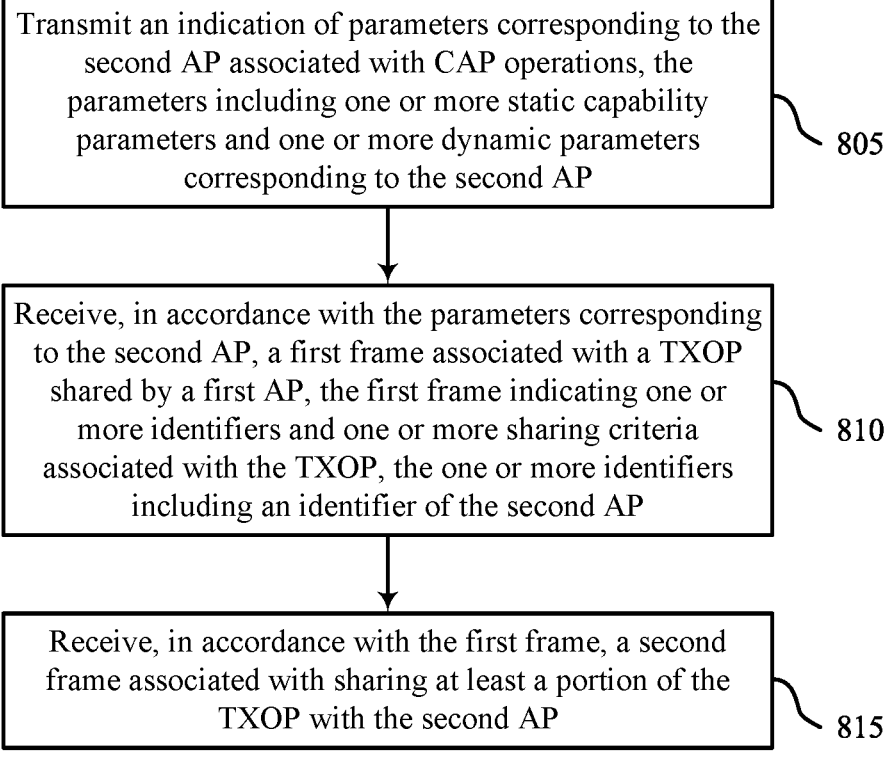

Transmit an indication of parameters corresponding to the second AP associated with CAP operations, the parameters including one or more static capability parameters and one or more dynamic parameters corresponding to the second AP

805

Receive, in accordance with the parameters corresponding to the second AP, a first frame associated with a TXOP shared by a first AP, the first frame indicating one or more identifiers and one or more sharing criteria associated with the TXOP, the one or more identifiers including an identifier of the second AP

810

Receive, in accordance with the first frame, a second frame associated with sharing at least a portion of the TXOP with the second AP

INFORMATION EXCHANGES FOR COORDINATED ACCESS POINT OPERATIONS

TECHNICAL FIELD

This disclosure relates to wireless communication and, more specifically, to information exchanges for coordinated access point (CAP) operations.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In a contention-based network, a first AP can reserve or otherwise gain access to a wireless medium for a duration of time known as a transmit opportunity (TXOP). If the first AP does not intend to use all of the TXOP, the first AP can share part of the TXOP with a second AP. However, conventional TXOP sharing schemes may be associated with excessive signaling overhead, poor spectral efficiency, and delays.

SUMMARY

The systems, methods, and devices of this disclosure each have several innovative aspects, no single one of which is solely responsible for the desirable attributes disclosed herein.

One innovative aspect of the subject matter described in this disclosure can be implemented in a first access point (AP). The first AP may include one or more memories storing processor-executable code and one or more processors coupled with the one or more memories. The one or more memories and the one or more processors may be individually or collectively configured to, when executing the code, cause the first AP to: receive an indication of parameters corresponding to one or more second APs associated with coordinated AP (CAP) operations, the parameters including one or more static capability parameters and one or more dynamic parameters corresponding to each of the one or more second APs; transmit, in accordance with the parameters corresponding to the one or more second APs, a first frame associated with a transmit opportunity (TXOP) shared by the first AP, the first frame indicating one or more identifiers corresponding to the one or more second APs and one or more sharing criteria associated with the TXOP; and transmit, in accordance with the first frame, one or more second frames associated with sharing a portion of the TXOP with at least one second AP of the one or more second APs.

Another innovative aspect of the subject matter described in this disclosure can be implemented in a method for wireless communication by the first AP. The method may include: receiving an indication of parameters corresponding to one or more second APs associated with CAP operations, the parameters including one or more static capability parameters and one or more dynamic parameters corresponding to each of the one or more second APs; transmitting, in accordance with the parameters corresponding to the one or more second APs, a first frame associated with a TXOP shared by the first AP, the first frame indicating one or more identifiers corresponding to the one or more second APs and one or more sharing criteria associated with the TXOP; and transmitting, in accordance with the first frame, one or more second frames associated with sharing a portion of the TXOP with at least one second AP of the one or more second APs.

One innovative aspect of the subject matter described in this disclosure can be implemented in a second AP. The second AP may include one or more memories storing processor-executable code and one or more processors coupled with the one or more memories. The one or more memories and the one or more processors may be individually or collectively configured to, when executing the code, cause the second AP to: transmit an indication of parameters corresponding to the second AP associated with CAP operations, the parameters including one or more static capability parameters and one or more dynamic parameters corresponding to the second AP; receive, in accordance with the parameters corresponding to the second AP, a first frame associated with a TXOP shared by the first AP, the first frame indicating one or more identifiers and one or more sharing criteria associated with the TXOP, the one or more identifiers including an identifier of the second AP; and receive, in accordance with the first frame, a second frame associated with sharing at least a portion of the TXOP with the second AP.

Another innovative aspect of the subject matter described in this disclosure can be implemented in a method for wireless communication by the second AP. The method may include: transmitting an indication of parameters corresponding to the second AP associated with CAP operations, the parameters including one or more static capability parameters and one or more dynamic parameters corresponding to the second AP; receiving, in accordance with the parameters corresponding to the second AP, a first frame associated with a TXOP shared by the first AP, the first frame indicating one or more identifiers and one or more sharing criteria associated with the TXOP, the one or more identifiers including an identifier of the second AP; and receiving, in accordance with the first frame, a second frame associated with sharing at least a portion of the TXOP with the second AP.

In some implementations of the subject matter described in this disclosure, the parameters may indicate respective capabilities of the one or more second APs to support coordinated time division multiple access (C-TDMA), coordinated spatial reuse (C-SR), coordinated orthogonal frequency division multiple access (C-OFDMA), or a combination thereof.

In some implementations of the subject matter described in this disclosure, the one or more static capability parameters indicate one or more of respective processing times or CAP modes supported by the one or more second APs.

In some implementations of the subject matter described in this disclosure, the one or more dynamic parameters indicate one or more of respective medium access demands, traffic priorities, or service period information associated with the one or more second APs.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 7 and 8 show flowcharts illustrating example processes performable at a wireless AP that supports information exchanges for coordinated AP operations.

Like reference numbers and designations in the various drawings indicate like elements.

DETAILED DESCRIPTION

Figure 1:
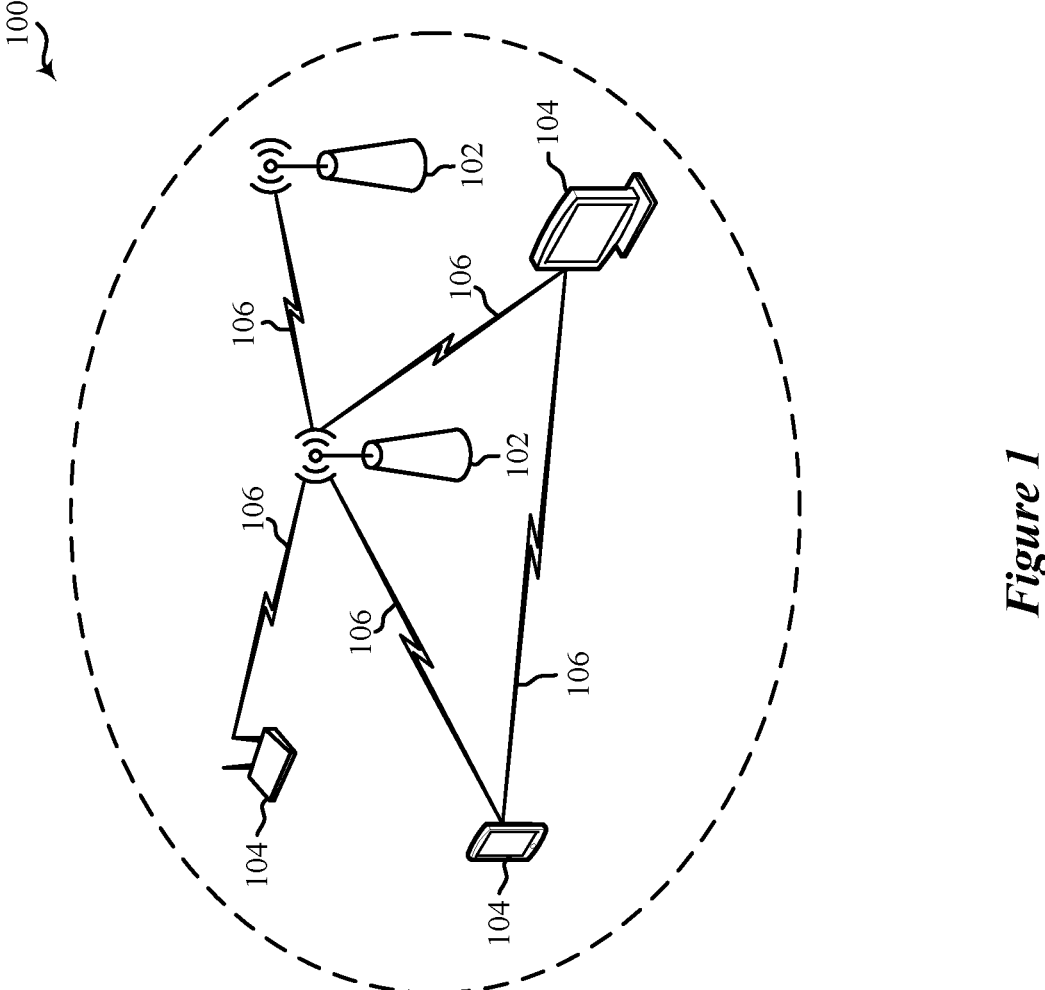
FIG. 1 shows a pictorial diagram of an example wireless local area network (WLAN).

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others.

The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Some wireless local area networks (WLANs) may support access point (AP) coordination schemes, such as coordinated TDMA (C-TDMA), coordinated spatial reuse (C-SR), and coordinated OFDMA (C-OFDMA), among other examples. Coordinated AP (CAP) communication schemes may enable one AP to share a transmit opportunity (TXOP) with other APs in a manner that promotes lower communication resource overhead, reduced latency, and greater spectral efficiency. For example, if a first AP (also referred to as a sharing AP or a TXOP owner) gains access to a wireless medium for a TXOP but does not intend to use all of the TXOP, the first AP can share part of the TXOP with one or more second APs (also referred to as shared APs), thereby reducing the amount of unused (or underutilized) communication resources in the TXOP. Either the first AP or the one or more second APs also may be a group owner (GO) of a Wi-Fi Direct network. In some implementations, however, the first AP may be unaware of which (if any) of the second APs support CAP operations or which CAP operating modes are supported by the second APs. The first AP also may be unaware of which (if any) of the second AP(s) have pending traffic. Sharing a TXOP with an AP that does not support CAP operations or that has no pending traffic may result in higher signaling overhead, reduced throughput, poor spectral efficiency, and loss of the wireless medium.

Various aspects relate generally to improving the efficiency of CAP operations in a WLAN. Some aspects more specifically relate to transmitting and receiving CAP-related information to facilitate TXOP sharing between a first AP (such as a sharing AP) and one or more second APs (such as shared APs). In some implementations, upon (or prior to) gaining access to a wireless medium for a TXOP, the first AP may perform a CAP information exchange with the one or more second APs before sharing the TXOP with the one or more second APs. The first AP may initiate the CAP information exchange by advertising (i.e., transmitting an indication of) CAP-related parameters to the one or more second APs. The parameters may include one or more static capability parameters (such as whether the first AP supports a particular CAP mode) and dynamic parameters (such as whether carrier sensing is enabled for the TXOP). The one or more second APs may respond accordingly, for example, by advertising their CAP-related parameters to the first AP. The one or more second APs also may advertise information about pending traffic at the one or more second APs, such as an amount of pending traffic at each of the one or more second APs or priority information, such as access categories (ACs), associated with the pending traffic at the one or more second APs. After the CAP information exchange, the first AP may set a TXOP sharing schedule according to the CAP parameters provided by the one or more second APs, and the first AP may advertise the TXOP sharing schedule via an announcement frame. The announcement frame may indicate, for example, a list of APs with which the first AP intends to share the TXOP, criteria for using the TXOP, such as thresholds related to traffic priority, latency requirements, or throughput requirements, and other pertinent information, such as a duration of time for which the scheduled APs will have access to the medium, etc. Accordingly, the first AP may share the TXOP with at least one of the second APs, for example, by transmitting a triggering frame to one or more of the second APs.

Particular aspects of the subject matter described in this disclosure can be implemented to realize one or more of the following potential advantages. In some implementations, enabling the first AP to select or otherwise determine a TXOP sharing schedule according to CAP-related information provided by the one or more second APs may reduce signaling overhead, improve spectral efficiency, reduce latency, and provide for more efficient utilization of communication resources. For example, if the CAP-related information indicates that some of the second APs have high priority traffic (such as voice data), the first AP can schedule these APs ahead of (or in lieu of) other APs with limited traffic or low priority traffic (such as background data). Additionally, or alternatively, if the CAP-related information indicates that one of the second APs has a defined processing time, the first AP can preemptively adjust the quantity of padding bits in a subsequent announcement frame or triggering frame to ensure that the second AP is allocated at least the defined processing time to respond to any messages from the first AP, thereby reducing the likelihood of other communication devices occupying the wireless medium during the TXOP. In some implementations, instead of or in addition to including padding bits in the announcement frame, the first AP can schedule a frame exchange at a third wireless device before the portion of the TXOP allocated to the second AP. The third wireless device may be a station (STA) associated with the first AP or another AP that supports CAP operations with a shorter processing time (relative to the processing time of the second AP). Similar to the padding bits, the frame exchange can ensure that the medium remains occupied. Using a frame exchange to keep the medium occupied may promote more efficient airtime utilization.

FIG. 1 shows a pictorial diagram of an example WLAN 100. According to some aspects, the WLAN 100 can be an example of a Wi-Fi network. For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11bc, 802.11bf, and 802.11bn). The WLAN 100 may include numerous wireless communication devices such as a wireless AP 102 and multiple wireless STAs 104. While only one AP 102 is shown in FIG. 1, the WLAN 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR) can be further improved by a small cell which is supported by an AP 102 serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples. The various STAs 104 in the network are able to communicate with one another via the AP 102.

A single AP 102 and an associated one or more STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHZ, 5 GHZ, 6 GHZ or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds ($\mu$s)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some implementations, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some implementations, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links. Additionally, two STAs 104 may communicate via a direct communication link regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHZ and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4 GHZ, 5 GHZ or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHZ, 80 MHZ, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

Figure 2:
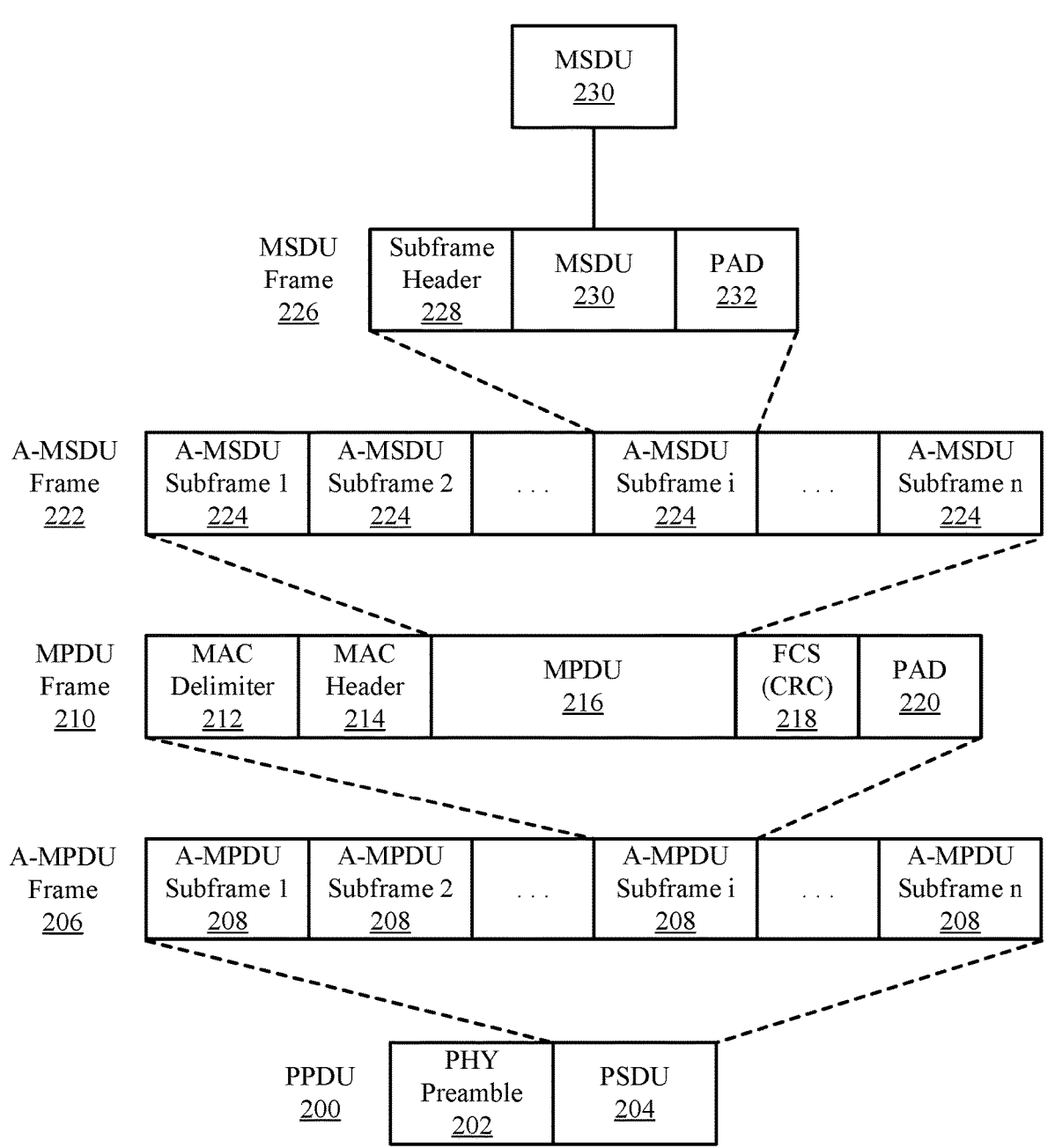
FIG. 2 shows a hierarchical format of an example physical layer (PHY) protocol data unit (PPDU) usable for communications between a wireless access point (AP) and one or more wireless stations (STAs).

FIG. 2 shows a hierarchical format of an example PPDU usable for communications between a wireless AP 102 and one or more wireless STAs 104. As described, each PPDU 200 includes a PHY preamble 202 and a PSDU 204. Each PSDU 204 may represent (or "carry") one or more MAC protocol data units (MPDUs) 216. For example, each PSDU 204 may carry an aggregated MPDU (A-MPDU) 206 that includes an aggregation of multiple A-MPDU subframes 208. Each A-MPDU subframe 206 may include an MPDU frame 210 that includes a MAC delimiter 212 and a MAC header 214 prior to the accompanying MPDU 216, which includes the data portion ("payload" or "frame body") of the MPDU frame 210. Each MPDU frame 210 also may include a frame check sequence (FCS) field 218 for error detection (for example, the FCS field may include a cyclic redundancy check (CRC)) and padding bits 220. The MPDU 216 may carry one or more MAC service data unit (MSDU) frames 226. For example, the MPDU 216 may carry an aggregated MSDU (A-MSDU) 222 including multiple A-MSDU subframes 224. Each A-MSDU subframe 224 contains a corresponding MSDU 230 preceded by a subframe header 228 and in some implementations followed by padding bits 232.

Referring back to the MPDU frame 210, the MAC delimiter 212 may serve as a marker of the start of the associated MPDU 216 and indicate the length of the associated MPDU 216. The MAC header 214 may include multiple fields containing information that defines or indicates characteristics or attributes of data encapsulated within the frame body. The MAC header 214 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 214 also includes one or more fields indicating addresses for the data encapsulated within the frame body. For example, the MAC header 214 may include a combination of a source address, a transmitter address, a receiver address or a destination address. The MAC header 214 may further include a frame control field containing control information. The frame control field may specify a frame type, for example, a data frame, a control frame, or a management frame.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it may wait for a particular time and then contend for access to the wireless medium. The DCF is implemented through the use of time intervals (including the slot time (or "slot interval") and the inter-frame space (IFS). IFS provides priority access for control frames used for proper network operation. Transmissions may begin at slot boundaries. Different varieties of IFS exist including the short IFS (SIFS), the distributed IFS (DIFS), the extended IFS (EIFS), and the arbitration IFS (AIFS). The values for the slot time and IFS may be provided by a suitable standard specification, such as one or more of the IEEE 802.11 family of wireless communication protocol standards.

In some implementations, the wireless communication device may implement the DCF through the use of carrier sense multiple access (CSMA) with collision avoidance (CA) (CSMA/CA) techniques. According to such techniques, before transmitting data, the wireless communication device may perform a clear channel assessment (CCA) and may determine (for example, identify, detect, ascertain, calculate, or compute) that the relevant wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine (for example, identify, detect, ascertain, calculate, or compute) whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy.

Virtual carrier sensing is accomplished via the use of a network allocation vector (NAV), which effectively serves as a time duration that elapses before the wireless communication device may contend for access even in the absence of a detected symbol or even if the detected energy is below the relevant threshold. The NAV is reset each time a valid frame is received that is not addressed to the wireless communication device. When the NAV reaches 0, the wireless communication device performs the physical carrier sensing. If the channel remains idle for the appropriate IFS, the wireless communication device initiates a backoff timer, which represents a duration of time that the device senses the medium to be idle before it is permitted to transmit. If the channel remains idle until the backoff timer expires, the wireless communication device becomes the holder (or "owner") of a TXOP and may begin transmitting. The TXOP is the duration of time the wireless communication device can transmit frames over the channel after it has "won" contention for the wireless medium. The TXOP duration may be indicated in the U-SIG field of a PPDU. If, on the other hand, one or more of the carrier sense mechanisms indicate that the channel is busy, a MAC controller within the wireless communication device will not permit transmission.

Each time the wireless communication device generates a new PPDU for transmission in a new TXOP, it randomly selects a new backoff timer duration. The available distribution of the numbers that may be randomly selected for the backoff timer is referred to as the contention window (CW). There are different CW and TXOP durations for each of the four access categories (ACs): voice (AC_VO), video (AC_VI), background (AC_BK), and best effort (AC_BE). This enables particular types of traffic to be prioritized in the network.

Some APs 102 and STAs 104 may implement spatial reuse techniques. For example, APs 102 and STAs 104 configured for communications using IEEE 802.11ax or 802.11be may be configured with a BSS color. APs 102 associated with different BSSs may be associated with different BSS colors. A BSS color is a numerical identifier of an AP's respective BSS (such as a 6 bit field carried by the SIG field). Each STA 104 may learn its own BSS color upon association with the respective AP 102. BSS color information is communicated at both the PHY and MAC sublayers. If an AP 102 or a STA 104 detects, obtains, selects, or identifies, a wireless packet from another wireless communication device while contending for access, the AP 102 or STA 104 may apply different contention parameters in accordance with whether the wireless packet is transmitted by, or transmitted to, another wireless communication device within its BSS or from a wireless communication device from an overlapping BSS (OBSS), as determined, identified, ascertained, or calculated by a BSS color indication in a preamble of the wireless packet. For example, if the BSS color associated with the wireless packet is the same as the BSS color of the AP 102 or STA 104, the AP 102 or STA 104 may use a first received signal strength indication (RSSI) detection threshold when performing a CCA on the wireless channel. However, if the BSS color associated with the wireless packet is different than the BSS color of the AP 102 or STA 104, the AP 102 or STA 104 may use a second RSSI detection threshold in lieu of using the first RSSI detection threshold when performing the CCA on the wireless channel, the second RSSI detection threshold being greater than the first RSSI detection threshold. In this way, the criteria for winning contention are relaxed when interfering transmissions are associated with an OBSS.

Some APs 102 and STAs 104 may implement techniques for spatial reuse that involve participation in a coordinated communication scheme. According to such techniques, an AP 102 may contend for access to a wireless medium to obtain control of the medium for a TXOP. The AP 102 that wins the contention (hereinafter also referred to as a "sharing AP") may select one or more other APs 102 (hereinafter also referred to as "shared APs") to share resources of the TXOP. The sharing and shared APs 102 may be located in proximity to one another such that at least some of their wireless coverage areas at least partially overlap. Some examples may specifically involve CAP TDMA or OFDMA techniques for sharing the time or frequency resources of a TXOP. To share its time or frequency resources, the sharing AP 102 may partition the TXOP into multiple time segments or frequency segments each including respective time or frequency resources representing a portion of the TXOP. The sharing AP 102 may allocate the time or frequency segments to itself or to one or more of the shared APs 102. For example, each shared AP 102 may utilize a partial TXOP assigned by the sharing AP 102 for its uplink or downlink communications with its associated STAs 104.

In some implementations of such TDMA techniques, each portion of a plurality of portions of the TXOP includes time resources that do not overlap with any time resources of any other portion of the plurality of portions. In such examples, the scheduling information may include an indication of time resources, of multiple time resources of the TXOP, associated with each portion of the TXOP. For example, the scheduling information may include an indication of a time segment of the TXOP such as an indication of one or more slots or sets of symbol periods associated with each portion of the TXOP such as for multi-user TDMA.

In some other examples of OFDMA techniques, each portion of the plurality of portions of the TXOP includes frequency resources that do not overlap with any frequency resources of any other portion of the plurality of portions. In such implementations, the scheduling information may include an indication of frequency resources, of multiple frequency resources of the TXOP, associated with each portion of the TXOP. For example, the scheduling information may include an indication of a bandwidth portion of the wireless channel such as an indication of one or more subchannels or resource units (RUs) associated with each portion of the TXOP such as for multi-user OFDMA.

In this manner, the sharing AP's acquisition of the TXOP enables communication between one or more additional shared APs 102 and their respective BSSs, subject to appropriate power control and link adaptation. For example, the sharing AP 102 may limit the transmit powers of the selected shared APs 102 such that interference from the selected APs 102 does not prevent STAs 104 associated with the TXOP owner from successfully decoding packets transmitted by the sharing AP 102. Such techniques may be used to reduce latency because the other APs 102 may not need to wait to win contention for a TXOP to be able to transmit and receive data according to conventional CSMA/CA or EDCA techniques. Additionally, by enabling a group of APs 102 associated with different BSSs to participate in a CAP transmission session, during which the group of APs 102 may share at least a portion of a single TXOP obtained by any one of the participating APs 102, such techniques may increase throughput across the BSSs associated with the participating APs 102 and also may achieve improvements in throughput fairness. Furthermore, with appropriate selection of the shared APs 102 and the scheduling of their respective time or frequency resources, medium utilization may be maximized or otherwise increased while packet loss resulting from OBSS interference is minimized or otherwise reduced. Various implementations may achieve these and other advantages without requiring that the sharing AP 102 or the shared APs 102 be aware of the STAs 104 associated with other BSSs, without requiring a preassigned or dedicated master AP 102 or preassigned groups of APs 102, and without requiring backhaul coordination between the APs 102 participating in the TXOP.

In some implementations in which the signal strengths or levels of interference associated with the selected APs 102 are relatively low (such as less than a given value), or when the decoding error rates of the selected APs 102 are relatively low (such as less than a threshold), the start times of the communications among the different BSSs may be synchronous. Conversely, when the signal strengths or levels of interference associated with the selected APs 102 are relatively high (such as greater than the given value), or when the decoding error rates of the selected APs 102 are relatively high (such as greater than the threshold), the start times may be offset from one another by a time period associated with decoding the preamble of a wireless packet and determining, from the decoded preamble, whether the wireless packet is an intra-BSS packet or is an OBSS packet. For example, the time period between the transmission of an intra-BSS packet and the transmission of an OBSS packet may allow a respective AP 102 (or its associated STAs 104) to decode the preamble of the wireless packet and obtain the BSS color value carried in the wireless packet to determine whether the wireless packet is an intra-BSS packet or an OBSS packet. In this manner, each of the participating APs 102 and their associated STAs 104 may be able to receive and decode intra-BSS packets in the presence of OBSS interference.

In some implementations, the sharing AP 102 may perform polling of un-managed or non-co-managed APs 102 that support C-SR to identify candidates for future spatial reuse opportunities. For example, the sharing AP 102 may transmit one or more spatial reuse poll frames as part of determining one or more spatial reuse criteria and selecting one or more other APs 102 to be shared APs 102. According to the polling, the sharing AP 102 may receive responses from one or more of the polled APs 102. In some specific examples, the sharing AP 102 may transmit a CAP TXOP indication (CTI) frame to other APs 102 that indicates time and frequency of resources of the TXOP that can be shared. The sharing AP 102 may select one or more candidate APs 102 upon receiving a CAP TXOP request (CTR) frame from a respective candidate AP 102 that indicates a desire by the respective AP 102 to participate in the TXOP. The poll responses or CTR frames may include a power indication, for example, an RX power or RSSI measured by the respective AP 102. In some other examples, the sharing AP 102 may directly measure potential interference of a service supported (such as UL transmission) at one or more APs 102, and select the shared APs 102 associated with the measured potential interference. The sharing AP 102 generally selects the APs 102 to participate in C-SR such that it still protects its own transmissions (which may be referred to as primary transmissions) to and from the STAs 104 in its BSS. The selected APs 102 may then be allocated resources during the TXOP as described above.

In some implementations, a first AP 102 (such as a sharing AP) may receive an indication of parameters corresponding to one or more second APs 102 (such as shared APs) associated with CAP operations. The parameters may include one or more static parameters and one or more dynamic parameters corresponding to each of the one or more second APs 102. Using these parameters, the first AP 102 may transmit a first frame associated with sharing a TXOP with the one or more second APs 102. The first frame may identify the one or more second APs 102 and convey sharing criteria associated with the TXOP. The first AP 102 may transmit, in accordance with the first frame, one or more second frames associated with sharing a portion of the TXOP with at least one second AP 102 of the one or more second APs 102. Accordingly, the at least one second AP 102 may use the shared portion of the TXOP to communicate with one or more STAs 104.

Figure 3A:
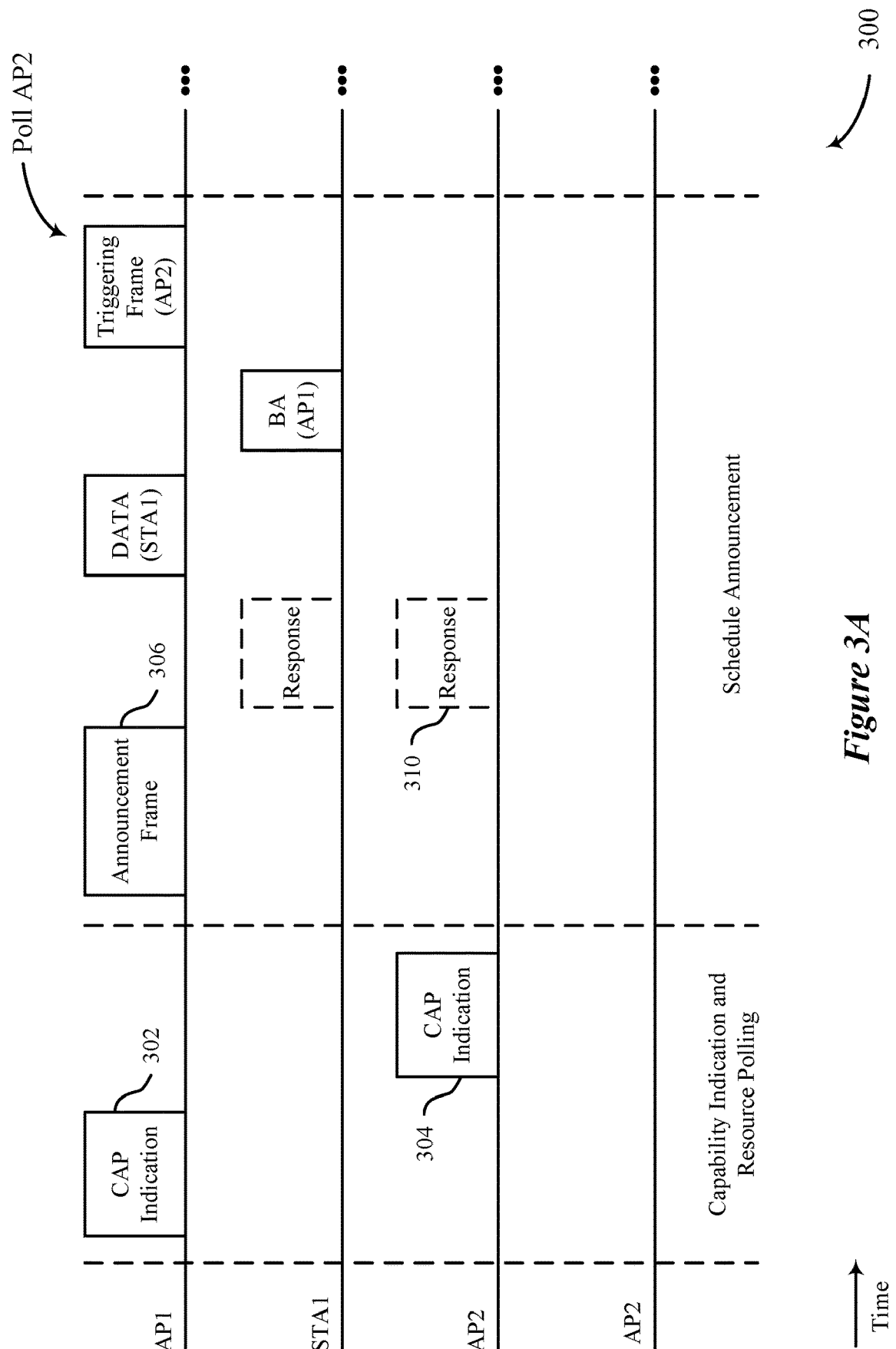
FIGS. 3A and 3B show example communication timelines that support information exchanges for coordinated AP (CAP) operations.
Figure 3B:
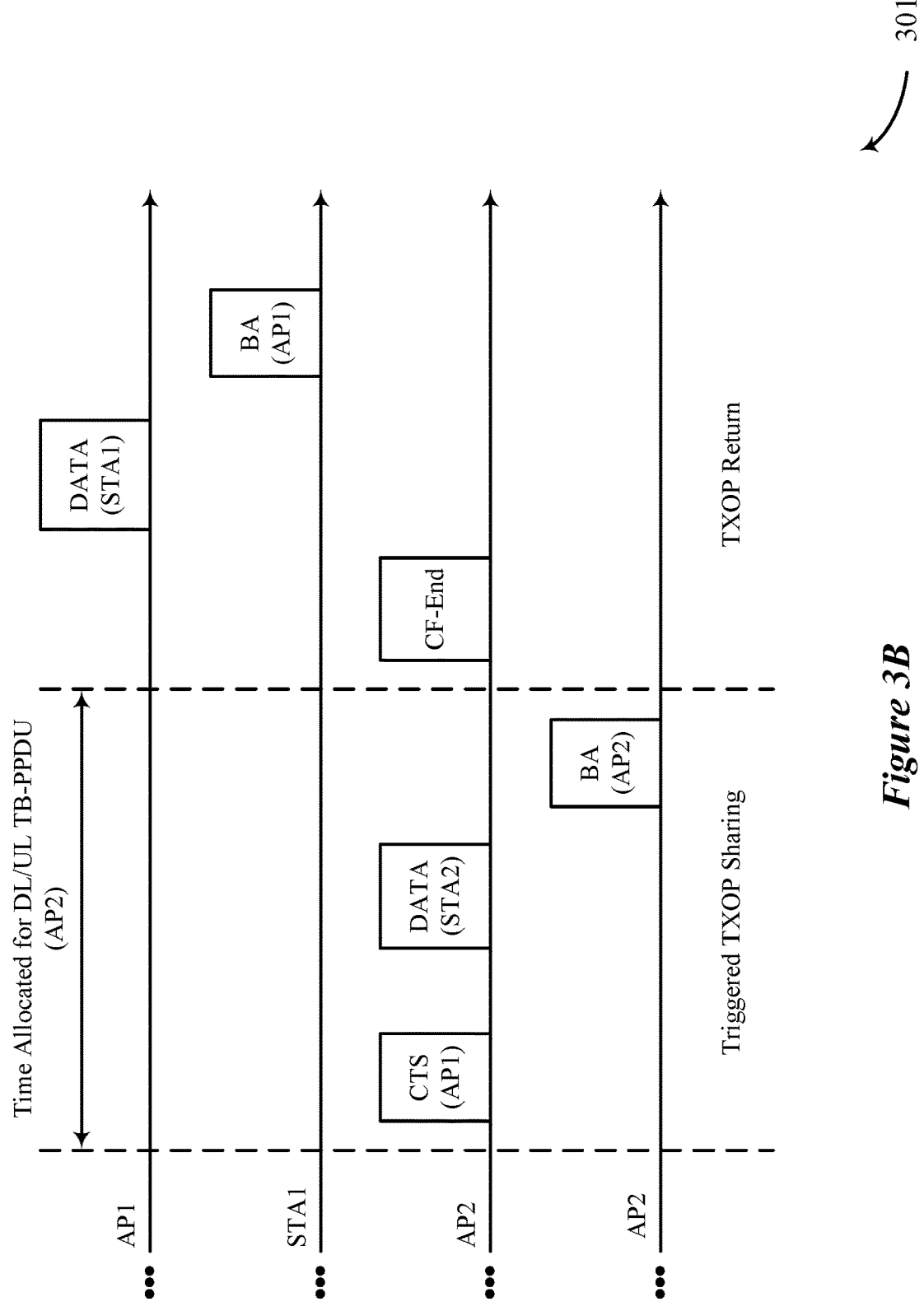

FIGS. 3A and 3B show examples of a communication timeline 300 and a communication timeline 301, respectively, that support information exchanges for CAP operations. The communication timelines 300 and 301 may each implement or be implemented by aspects of the WLAN 100, as depicted and described with reference to FIG. 1. FIG. 3B may be an extension of FIG. 3A in that the communications illustrated in FIG. 3B occur after the communications illustrated in FIG. 3A. For example, the communication timelines 300 and 301 include a first AP (AP1) and a second AP (AP2), both of which may be examples of aspects of a wireless AP or GO, such as the AP 102 shown and described with reference to FIG. 1. Likewise, the communication timelines 300 and 301 include a first STA (STA1) and a second STA (STA2), both of which may be examples of aspects of a wireless STA, such as the STAs 104 shown and described with reference to FIG. 1.

The communication timelines 300 and 301 show examples of information exchanges for CAP operations. As described herein, including with reference to FIGS. 1 and 2, 802.11*bn* may support multiple AP coordination schemes (such as C-TDMA, C-SR, and C-OFDMA) that enable APs to share TXOPs in time/frequency domain. In the example of FIG. 3A, AP1 (referred to hereinafter as a sharing AP) may advertise a CAP indication 302 to nearby APs, such as AP2. Accordingly, AP2 (referred to hereinafter as a shared AP) may respond with a corresponding CAP indication 304. The CAP indications 302 and 304 may indicate CAP capabilities (such as whether AP1 supports C-TDMA), processing delays (such as how long it takes AP2 to prepare for transmission), identifiers (.such as a shortened ID) for AP1 and AP2, and buffer status information, among other examples. After the initial CAP information exchange between AP1 and AP2, AP1 may transmit a first frame 306 (referred to hereinafter as an announcement frame) to notify shared APs (such as AP2) of the presence of an upcoming shared TXOP, such that shared AP(s) with longer processing times can prepare for the upcoming shared TXOP and begin transmissions in a timely manner. If multiple shared APs are present, the announcement frame 306 can assist with coordinating transmissions, thereby reducing the likelihood of interference and signal collisions.

In some implementations, AP1 may begin TXOP coordination before gaining access to the wireless medium. For example, AP1 may communicate with nearby APs (such as AP2) before gaining access to the wireless medium, to determine if those APs are capable of sharing the TXOP with AP1 once access to the medium is obtained. As discussed above, AP1 can provide CAP-related information to AP2 in a frame or message. The CAP-related information (also referred to as parameters associated with CAP operations) may indicate CAP capabilities (such as support for C-TDMA or C-SR), short IDs (for inclusion in the announcement frame 306), processing delays, demands for medium time, and traffic priorities. The CAP indications 302 and 304 can be conveyed in a broadcast frame, a unicast frame or a management frame (such as a Beacon frame, a Beacon-A frame, or a dedicated management frame defined for CAP). The CAP-related information can be included in one or more CAP-specific elements, or carried in fields within an IE, such as a UHR Capabilities IE.

The CAP indications 302 and 304 may include static properties and dynamic properties for AP1 and AP2, respectively. The static properties may include processing delay, supported CAP modes (such as C-TDMA, C-SR, or C-OFDMA), parameters related to each CAP mode, and shortened ID(s) of AP1 and AP2. The dynamic properties may include a demand for medium time, the priority of corresponding traffic, and service period information associated with the one or more second APs. This CAP-related information can be fine-grained (such as per traffic identifier (TID) or AC) or coarse (with all demand aggregated together). The demand can be in units of octets, bandwidth-time products, individual bits (to indicate that there is some demand), or AC bitmaps, among other examples.

The sharing AP (such as AP1) may determine a TXOP sharing schedule associated with the CAP-related information provided by shared APs (such as AP2). The sharing AP may schedule shared APs associated with the priority of their demands. Specifically, a shared AP with higher priority traffic may be prioritized over shared APs with lower priority traffic. If the TXOP is associated with a particular AC, the sharing AP may selectively share the TXOP with shared APs that have pending traffic with an equal or higher priority (compared to the AC). In some implementations, rather than sending the CAP indications 302 and 304 in frames via OTA messaging, the CAP indications 302 and 304 can be exchanged via backhaul connections. To compensate for processing delays indicated by the shared APs, the sharing AP can use padding in the announcement frame 306, or perform a frame exchange with other devices before transmissions of the shared AP in the shared TXOP. For example, if a shared AP (such as AP2) has a processing delay of 1 ms, the sharing AP (such as AP1) can transmit the first frame (also referred to as an announcement frame) and subsequently transmit DATA to a client device (such as STA1) for 1.2 ms before transmitting the second frame (also referred to as a triggering frame) to the sharing AP. The duration of the DATA (1.2 ms) may be greater than the processing delay of the shared AP (1 ms), which may ensure that the shared AP is ready to use the shared TXOP after the second frame is sent. The DATA and BA shown and described with reference to FIG. 3A may, in some implementations, be a part of one such frame exchange between AP1 and STA1.

The contents of the announcement frame 306 (also referred to as a first frame) may include a list of shared APs that the sharing AP intends to serve, a total duration of the TXOP, a minimum or lower-bound TXOP duration to be shared with a shared AP, a traffic priority or some other criteria to use the TXOP, whether carrier sensing is enabled for shared APs during the TXOP, whether excluded APs (such as APs not indicated in the announcement frame 306) should defer transmissions during the TXOP, and RU(s) allocated for responses from the shared AP(s). The RUs allocated to a shared AP may be identified by the short ID provided by the shared AP during the CAP information exchange. Providing an announcement response 310 to the sharing AP may enable the sharing AP to confirm the availability and interest of an OBSS AP to participate in the shared TXOP. If the OBSS AP does not respond to the announcement frame 306, or if the OBSS AP indicates that it is not interested in using the TXOP (such as when the OBSS has no pending traffic), the sharing AP can update its scheduling decisions and allocate more time to another AP, allocate more time for its own communications with STA1, and so on. The frame type of the announcement frame 306 may be an extension of a trigger frame or a new frame entirely.

As discussed, AP2 (and, in some implementations, STA1) may transmit a response 310 to the announcement frame 306 via RU(s) indicated by the announcement frame 306. If no response 310 is received, the sharing AP may determine which of the shared AP(s) have pending traffic by triggering the list of shared APs identified in the announcement frame 306, one after another. For each of the shared APs that are triggered, if an immediate response (such as a CTS frame) is received after the triggering frame (such as a variation of multi-user request to send TXOP sharing (MU-RTS TXS) frame), the TXOP owner (such as AP1) may share the TXOP with the shared AP associated with the triggering frame (also referred to herein as a second frame). Otherwise, the sharing AP can use point coordination function (PCF) interframe space (PIFS) recovery or TXOP return to regain the TXOP, share it with the next shared AP, or use the TXOP by itself.

If a response 310 is present, the contents of the response 310 may include one or more of the following parameters: an identifier of the shared AP (such as a complete BSSID or a short ID); a demand for medium access time (similar to the format proposed for Beacon frames, but more up-to-date); the priority of the demand; a requested CAP operation mode (such as C-TDMA, C-SR or C-OFDMA); or a processing delay. The response 310 may be sent in a trigger-based (TB) PPDU (such that the sharing AP can receive responses 310 from one or more shared APs contemporaneously), a variation of a clear to send (CTS) frame (in which some fields are redefined to carry the contents of the response 310), a variation of a quality of service (QoS) NULL frame, or a newly defined management frame. In some implementations, the announcement frame (which includes scheduling information associated with the TXOP) and the triggering frame (which shares a portion of the TXOP with one of the shared APs) may be combined into a single frame. For example, if AP1 intends to share the TXOP with AP2, and AP2 has a relatively short processing delay (in comparison to other shared APs), the triggering frame may include some or all of the contents of the announcement frame directly, thereby promoting reduced signaling overhead by enabling AP1 to skip (for example, refrain from transmitting) the announcement frame altogether.

Figure 4:
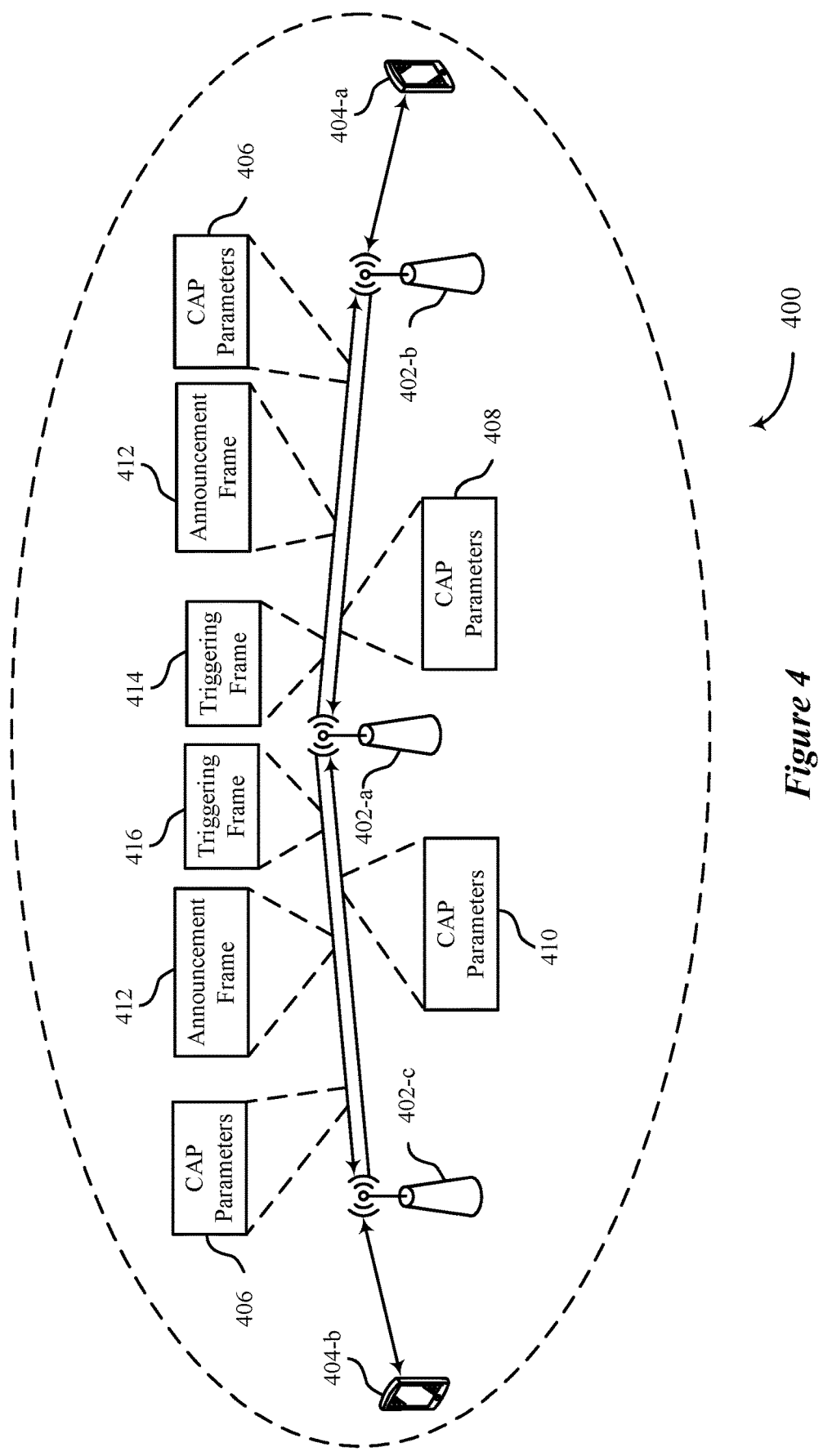
FIG. 4 shows an example network diagram that supports information exchanges for CAP operations.

FIG. 4 shows an example of a network diagram 400 that supports information exchanges for CAP operations. The network diagram 400 may implement or be implemented by aspects of the WLAN 100, as depicted and described with reference to FIG. 1. For example, the network diagram 400 includes an AP 402-a (such as a sharing AP), an AP 402-b (such as a first shared AP), and an AP 402-c (such as a second shared AP), each of which may be an example of aspects of a wireless AP, such as the AP 102 shown and described with reference to FIG. 1. Similarly, the network diagram 400 includes a STA 404-*a* and a STA 404-*b*, both of which may be examples of aspects of a wireless STA, such as the STAs 104 shown and described with reference to FIG. 1.

As described herein, including with reference to FIGS. 1 and 2, a WLAN may support various AP coordination schemes, such as C-TDMA, C-SR, and C-OFDMA, among other examples. CAP communication schemes may enable the AP 402-*a* (also referred to as a sharing AP or a TXOP owner) to share a TXOP with one or both of the AP 402-*b* and the AP 402-*c* (also referred to as shared APs) in a manner that promotes lower communication resource overhead, reduced latency, and greater spectral efficiency. For example, if the AP 402-*a* gains access to a wireless medium for a TXOP, but does not intend to use all of the TXOP, the AP 402-*a* can share part of the TXOP with one or both of the AP 402-*b* and the AP 402-*c*, thereby reducing the amount of unused (or underutilized) communication resources in the TXOP.

In some implementations, however, the AP 402-*a* may be unaware of which (if any) CAP operating modes are supported by the AP 402-*b* and the AP 402-*c* or how long the APs 402-*b* and 402-*c* take to prepare for transmissions. Also, the AP 402-*a* may not know whether the APs 402-*b* and 402-*c* have pending traffic. Sharing the TXOP with AP(s) that do not support CAP operations, or that have little to no pending traffic may result in higher signaling overhead, reduced throughput, and loss of the wireless medium.

Various aspects relate generally to improving the efficiency of CAP operations in a WLAN. Some aspects more specifically relate to transmitting and receiving CAP-related information to facilitate TXOP sharing between the AP 402-*a* and one or both of the AP 402-*b* and the AP 402-*c*. In some implementations, upon gaining access to a wireless medium for a TXOP, the AP 402-*a* may perform a CAP information exchange with one or more of the AP 402-*b* and the AP 402-*c* before sharing the TXOP with one or more of the AP 402-*b* and the AP 402-*c*. In particular, the AP 402-*a* advertise parameters 406 to one or more of the AP 402-*b* and the AP 402-*c*. The parameters 406 may include one or more static capability parameters (such as whether the AP 402-*a* supports a particular CAP mode) and dynamic parameters (such as whether carrier sensing is enabled for the TXOP).

The AP 402-*b* and the AP 402-*c* may respond accordingly, for example, by advertising their CAP-related information to the AP 402-*a*. For example, the AP 402-*b* may provide parameters 408 to the AP 402-*a*, and the AP 402-*c* may provide parameters 410 to the AP 402-*a*. The parameters 408 and 410 may indicate how much pending traffic the AP 402-*b* and the AP 402-*c* have, the priority of the pending traffic, and so on.

After the CAP information exchange between the APs 402-*a*, 402-*b*, and 402-*c*, the AP 402-*a* may configure a TXOP sharing schedule according to the parameters 408 and 410 provided by the AP 402-*b* and the AP 402-*c*, and may advertise the TXOP sharing schedule via an announcement frame 412 (also referred to as a first frame). The announcement frame 412 may indicate, for example, a list of APs with whom the AP 402-*a* intends to share the TXOP, a traffic priority threshold for using the TXOP, and other pertinent information. Accordingly, the AP 402-*a* may share the TXOP with one or both of the AP 402-*b* and the AP 402-*c*, for example, by transmitting triggering frames 414 and 416 (also referred to as second frames) to the AP 402-*b* and the AP 402-*c*. In turn the AP 402-*b* and the AP 402-*c* may use the shared TXOP to communicate with the STAs 404-*a* and 404-*b*.

Particular aspects of the subject matter shown and described with reference to FIG. 4 can be implemented to realize one or more of the following potential advantages. In some implementations, by configuring the AP 402-*a* to select or otherwise determine a CAP sharing schedule for the TXOP according to CAP parameters 408 and 410 provided by the AP 402-*b* and the AP 402-*c*, the described techniques can promote reduced signaling overhead, greater spectral efficiency, reduced latency, and more efficient utilization of communication resources. For example, if the CAP parameters 408 indicates that the AP 402-*b* has high priority traffic (such as voice data), the AP 402-*a* can allocate more resources to the AP 402-*b*, schedule the AP 402-*b* ahead of (or in lieu of) the AP 402-*b*, and so on.

Additionally, or alternatively, if the CAP parameters 410 indicate that the AP 402-*c* has a processing time of X microseconds, X being a positive integer, the AP 402-*a* can preemptively add a quantity of padding bits to the announcement frame 412 or the triggering frame 416 to ensure that the AP 402-*c* has at least X ms to respond to any messages from the AP 402-*a*, thereby reducing the likelihood of other communication devices occupying the wireless medium during the TXOP.

Figure 5:
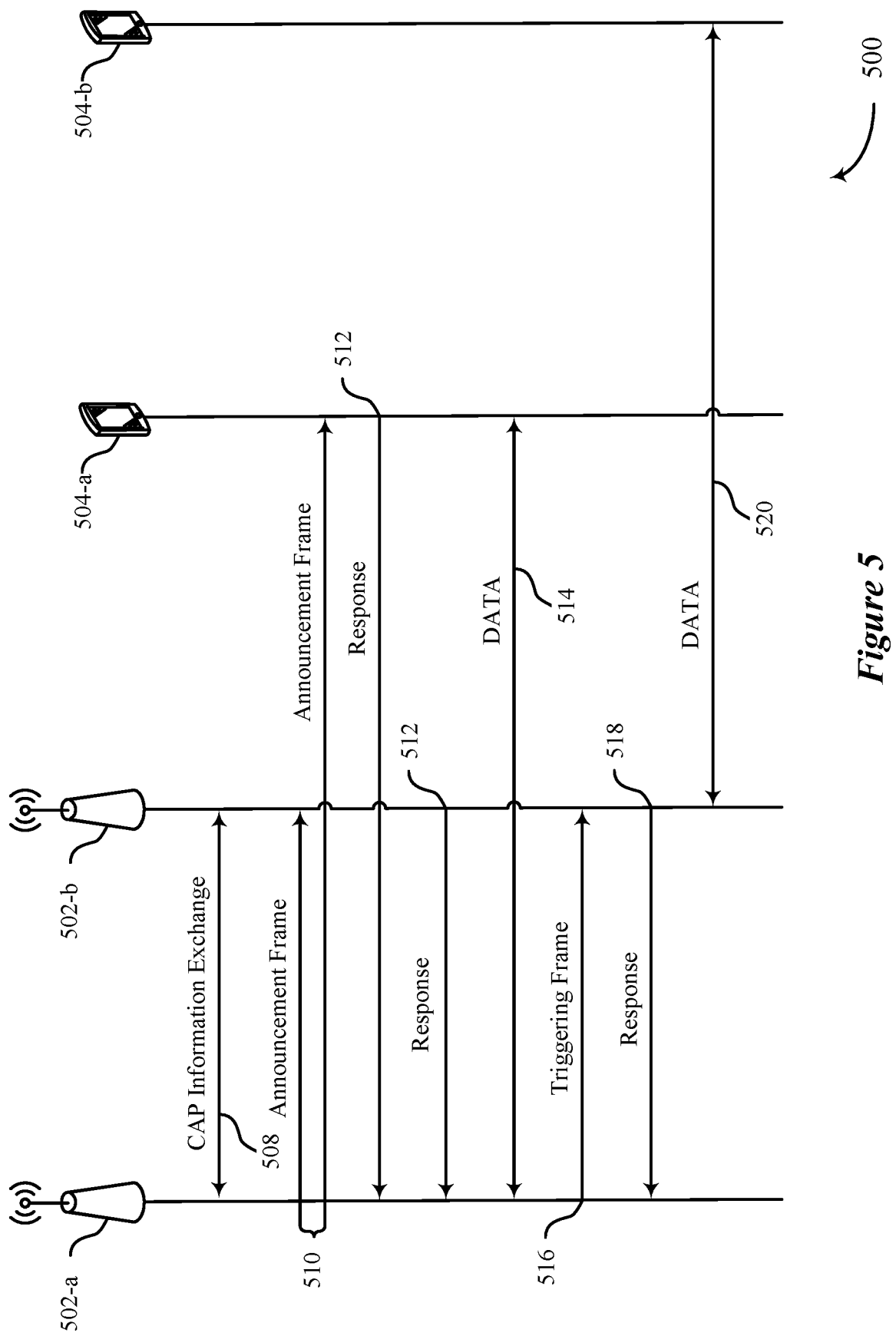
FIG. 5 shows an example process flow that supports information exchanges for CAP operations.

FIG. 5 shows an example process flow 500 that supports information exchanges for CAP operations. The process flow 500 may implement or be implemented by aspects of the WLAN 100, as depicted and described with reference to FIG. 1. For example, the process flow 500 includes an AP 502-*a* (such as a sharing AP) and an AP 502-*b* (such as a shared AP), both of which may be examples of aspects of a wireless AP, such as the AP 102 shown and described with reference to FIG. 1. Likewise, the process flow 500 includes a STA 504-*a* and a STA 504-*b*, both of which may be examples of aspects of a wireless STA, such as the STAs 104 shown and described with reference to FIG. 1. In the following description of the process flow 500, operations between the AP 502-*a*, the AP 502-*b*, the STA 504-*a*, and the STA 504-*b* may be added, omitted, or performed in a different order (with respect to the order shown in the example of FIG. 5).

At 508, the AP 502-*a* (also referred to as a first AP) may perform a CAP information exchange with the AP 502-*b* (also referred to as a second AP). For example, the AP 502-*a* may receive an indication of parameters associated with CAP operations at the AP 502-*b*. The parameters may include one or more static capability parameters and one or more dynamic parameters corresponding to the AP 502-*b*. The one or more static capability parameters may indicate a processing time of the AP 502-*b*, CAP modes supported by the AP 502-*b*, or both. The one or more dynamic parameters may indicate one or more of a medium access demand, a traffic priority, or service period information associated with the AP 502-*b*.

At 510, the AP 502-*a* may transmit, in accordance with the parameters provided by the AP 502-*b*, a first frame (such as the announcement frame 412 shown and described with reference to FIG. 4) associated with a TXOP shared by the AP 502-*a*. The first frame may indicate one or more identifiers corresponding to one or more second APs (such as the AP 502-*b*) and one or more sharing criteria associated with the TXOP. The one or more sharing criteria may include, for example, carrier sensing criteria (such as whether carrier sensing is enabled during the TXOP), traffic priority criteria (such as a minimum priority to use the TXOP), traffic deferment criteria (such as whether to defer other transmissions until the end of the TXOP), or any combination thereof. Additionally, or alternatively, the first frame may allocate respective RUs for SA response(s) from one or both of the AP 502-*a* and the STA 504-*a*. The first frame may share a portion of the TXOP with the AP 502-*b*. In some implementations, the first frame may include one shared AP (such as the AP 502-*b*), and the sharing AP (such as the AP 502-*a*) may handle the processing delay of the shared AP by including padding in the first frame and using the first frame to trigger the shared AP to start using the portion of the shared TXOP directly. In some implementations, the STA 504-*b* may be a GO of a Wi-Fi Direction network. In such implementations, the STA 504-*b* also may perform a CAP information exchange with the AP 502-*a*. Using the information exchanged, such as service period information associated with one or both of the AP 502-*b* and the STA 504-*b*, the AP 502-*a* may determine or select a schedule for sharing the TXOP with the AP 502-*b* and the STA 504-*b*. For example, if a service period associated with the AP 502-*b* and a service period associated with the STA 504-*b* overlap in time, and the traffic associated with the AP 502-*b* has a higher priority than traffic associated with the STA 504-*b*, the AP 502-*a* may share the TXOP with the AP 502-*b* first.

In some implementations, at 512, the AP 502-*b* may receive response(s) to the announcement frame (referred to hereinafter as announcement responses) from one or both of the AP 502-*b* or the STA 504-*a*. The announcement response(s) may indicate, for example, whether the AP 502-*b* or the STA 504-*a* intends to use the TXOP, whether the AP 502-*b* or the STA 504-*a* has pending traffic, and so on. The announcement response(s) may further indicate the priority of the pending traffic (if present), a medium access demand of the AP 502-*b* (such as a duration of time for which the AP 502-*b* requests access to the wireless medium), a priority of the medium access demand, a requested CAP operating mode of the AP 502-*b* (such as C-TDMA, C-SR, or C-OFDMA), a processing delay of the AP 502-*b*, a processing delay of the STA 504-*a*, an identifier of the AP 502-*b* (such as a complete BSSID or a short ID), an identifier of the STA 504-*a*, or any combination thereof.

In some other implementations, if the AP 502-*a* does not receive an announcement response from the AP 502-*b*, the AP 502-*a* may trigger each of the shared AP(s) indicated by the announcement frame in a sequential manner (i.e., one after another). The announcement response from the AP 502-*b* may include an identifier of the AP 502-*b*, an identifier of the AP 502-*a*, a medium access demand of the AP 502-*b*, a priority of the medium access demand, a CAP mode requested by the AP 502-*b*, a processing time of the AP 502-*b*, a duration for NAV protection, or a combination thereof. In some implementations, the AP 502-*b* may provide the response in a TB-PPDU, a CTS frame, a variant of a CTS frame, a QoS NULL frame, or a management frame associated with CAP operations. If the AP 502-*a* receives a response to the trigger, the AP 502-*a* may share the TXOP with the responding AP. If the AP 502-*a* does not receive a response to the trigger, the AP 502-*a* can use PIFS recovery or TXOP return to recover the TXOP and share the recovered TXOP with another AP. Additionally, or alternatively, the AP 502-*a* can use the recovered TXOP itself (such as to continue exchanging data with the STA 504-*a*).

The AP 502-*a* may configure a CAP sharing schedule for the TXOP using information from the announcement response(s) provided by the AP 502-*b* and the STA 504-*a*. For example, if all pending traffic of the AP 502-*a* is below a traffic priority threshold of the TXOP, the AP 502-*a* may refrain from scheduling the AP 502-*b* in the TXOP. Conversely, if the announcement responses indicate that the STA 504-*a* has high priority traffic (such as voice data), the AP 502-*a* may prioritize the STA 504-*a* in the CAP sharing schedule. The AP 502-*b* may, in some implementations, determine whether to share the TXOP with the AP 502-*b* associated with service period information associated with the AP 502-*b*, parameters associated with a service period of the AP 502-*b*, or both. At 514, the AP 502-*a* may use at least a portion of the TXOP to exchange data with the STA 504-*a*. For example, the AP 502-*a* may transmit pending DL data to the STA 504-*a*, and the STA 504-*a* may respond with a BA for the DL data.

At 516, the AP 502-*a* may transmit, in accordance with the CAP sharing schedule, one or more second frames associated with sharing a portion of the TXOP with the AP 502-*b*. In some implementations, the AP 502-*a* may share the portion of the TXOP with the AP 502-*b* in accordance with the AP 502-*b* having a pending traffic priority greater than or equal to a traffic priority threshold of the TXOP (such as the priority of an AC associated with the TXOP), as indicated by the sharing criteria provided in the announcement frame. The one or more second frames may include a control frame, such as a triggering frame or a management frame, that indicates a complete BSSID or short ID of the AP 502-*b*, a start of the portion of the TXOP shared with the AP 502-*b*, a duration or an end of the portion of the TXOP shared with the AP 502-*b*, or a combination thereof.

In some implementations, at 518, the AP 502-*b* may transmit a response to the one or more second frames from the AP 502-*a*. The response may include an identifier of the AP 502-*b*, an identifier of the AP 502-*a*, a medium access demand of the AP 502-*b*, a priority of the medium access demand, a CAP mode requested by the AP 502-*b*, a processing time of the AP 502-*b*, a duration for NAV protection, or a combination thereof. In some implementations, the AP 502-*b* may provide the response in a TB-PPDU, a CTS frame, a variant of a CTS frame, a QoS NULL frame, or a management frame associated with CAP operations.

At 520, The AP 502-*b* may use the portion of the TXOP shared by the AP 502-*a* to communicate with the STA 504-*b*. For example, the AP 502-*b* may transmit pending DL data to the STA 504-*b* using resources allocated to the AP 502-*b*, and the STA 504-*b* may respond with a BA for the DL data.

Figure 6:
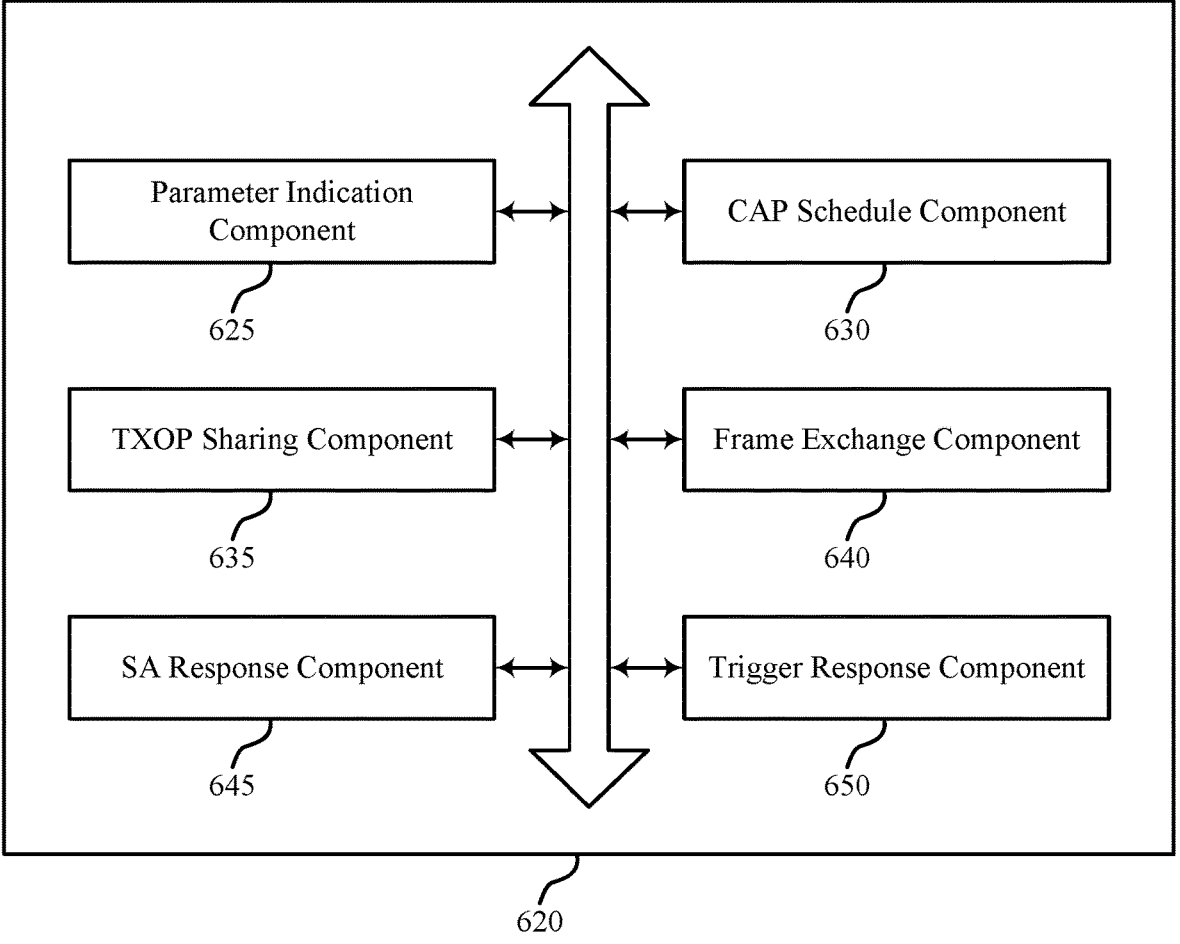
FIG. 6 shows a block diagram of an example wireless communication device that supports information exchanges for coordinated AP operations.
Figure 6:

FIG. 6 shows a block diagram of an example wireless communication device 600 that supports information exchanges for CAP operations. In various examples, the wireless communication device 600 can be a chip, SoC, chipset, package or device that may include: one or more modems (such as, a Wi-Fi (IEEE 802.11) modem or a cellular modem such as 3GPP 4G LTE or 5G compliant modem); one or more processors, processing blocks or processing elements (collectively "at least one processor"); one or more radios (collectively "at least one radio"); and one or more memories or memory blocks (collectively "at least one memory"). In some implementations, the at least one processor may include multiple processors, and the at least one memory may include multiple memories. One or more of the multiple processors may be coupled with one or more of the multiple memories which may, individually or collectively, be configured to perform various functions described herein (as part of a processing system). In some implementations, one or more of the multiple memories may be configured to store processor-executable code that, when executed, may configure one or more of the multiple processors to perform various functions described herein (as part of a processing system). In some other implementations, the processing system may be pre-configured to perform various functions described herein.

In some implementations, the wireless communication device 600 can be a device for use in an AP, such as AP 102 described with reference to FIG. 1. In some other examples, the wireless communication device 600 can be an AP that includes such a chip, SoC, chipset, package or device as well as multiple antennas. The wireless communication device 600 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some implementations, the wireless communication device 600 also includes or can be coupled with at least one application processor which may be further coupled with at least one memory. In some implementations, the wireless communication device 600 further includes at least one external network interface that enables communication with a core network or backhaul network to gain access to external networks including the Internet.

The wireless communication device 600 includes a parameter indication component 625, a CAP schedule component 630, a TXOP sharing component 635, a frame exchange component 640, an SA response component 645, and a trigger response component 650. Portions of one or more of the parameter indication component 625, the CAP schedule component 630, the TXOP sharing component 635, the frame exchange component 640, the SA response component 645, and the trigger response component 650 may be implemented at least in part in hardware or firmware. For example, one or more of the parameter indication component 625, the CAP schedule component 630, the TXOP sharing component 635, the frame exchange component 640, the SA response component 645, and the trigger response component 650 may be implemented at least in part by at least one modem. In some implementations, at least some of the parameter indication component 625, the CAP schedule component 630, the TXOP sharing component 635, the frame exchange component 640, the SA response component 645, and the trigger response component 650 are implemented at least in part by at least one processor and as software stored in at least one memory. For example, portions of one or more of the parameter indication component 625, the CAP schedule component 630, the TXOP sharing component 635, the frame exchange component 640, the SA response component 645, and the trigger response component 650 can be implemented as non-transitory instructions (or "code") executable by the at least one processor to perform the functions or operations of the respective module.

In some implementations, the at least one processor may be a component of a processing system. A processing system may generally refer to a system or series of machines or components that receives inputs and processes the inputs to produce outputs (which may be passed to other systems or components of, for example, the device 600). For example, a processing system of the device 600 may refer to a system including the various other components or subcomponents of the device 600, such as the at least one processor, or at least one transceiver, or at least one communications manager, or other components or combinations of components of the device 600. The processing system of the device 600 may interface with other components of the device 600, and may process information received from other components (such as inputs or signals) or output information to other components. For example, a chip or modem of the device 600 may include a processing system, a first interface to output information and a second interface to obtain information. In some implementations, the first interface may refer to an interface between the processing system of the chip or modem and a transmitter, such that the device 600 may transmit information output from the chip or modem. In some implementations, the second interface may refer to an interface between the processing system of the chip or modem and a receiver, such that the device 600 may obtain information or signal inputs, and the information may be passed to the processing system. A person having ordinary skill in the art will readily recognize that the first interface also may obtain information or signal inputs, and the second interface also may output information or signal outputs.

The AP 620 (referred to hereinafter as a first AP) may support wireless communication in accordance with one or more aspects of the subject matter described in this disclosure. The parameter indication component 625 is capable of, configured to, or operable to support a means for receiving an indication of parameters corresponding to one or more second APs associated with CAP operations, the parameters including one or more static capability parameters and one or more dynamic parameters corresponding to each of the one or more second APs. The CAP schedule component 630 is capable of, configured to, or operable to support a means for transmitting, in accordance with the parameters corresponding to the one or more second APs, a first frame associated with a TXOP shared by the first AP, the first frame indicating one or more identifiers corresponding to the one or more second APs and one or more sharing criteria associated with the TXOP. The TXOP sharing component 635 is capable of, configured to, or operable to support a means for transmitting, in accordance with the first frame, one or more second frames associated with sharing a portion of the TXOP with at least one second AP of the one or more second APs.

In some implementations, to support receiving the indication of the parameters, the parameter indication component 625 is capable of, configured to, or operable to support a means for receiving an indication of respective capabilities of the one or more second APs to support C-TDMA, C-SR, C-OFDMA, or a combination thereof.

In some implementations, to support receiving the indication of the parameters, the parameter indication component 625 is capable of, configured to, or operable to support a means for receiving a message including the indication of the parameters corresponding to the one or more second APs, where the message includes one or more of a broadcast, a unicast frame, a Beacon frame, a Beacon-A frame, or a dedicated management frame associated with CAP operations.

In some implementations, to support receiving the indication of the parameters, the parameter indication component 625 is capable of, configured to, or operable to support a means for receiving one or more of: one or more IEs associated with CAP operations that include the indication of the parameters corresponding to the one or more second APs, or one or more fields in a UHR capability IE that include the indication of the parameters corresponding to the one or more second APs.

In some implementations, the one or more static capability parameters indicate one or more of respective processing times or CAP modes supported by the one or more second APs. In some implementations, the one or more dynamic parameters indicate one or more of respective medium access demands, traffic priorities, or service period information associated with the one or more second APs.

In some implementations, the portion of the TXOP is shared with the at least one second AP according to the service period information associated with the at least one second AP. In some implementations, the one or more second frames includes the one or more identifiers provided in the first frame.

In some implementations, the respective medium access demands and traffic priorities are indicated per-TID or per-AC. In some implementations, the respective medium access demands and traffic priorities are aggregated. In some implementations, the respective medium access demands are signaled as octets, bandwidth-time units, a bitmap mapped to ACs, or binary indications.

In some implementations, to support transmitting the first frame, the CAP schedule component 630 is capable of, configured to, or operable to support a means for transmitting, via the first frame, an indication of a CAP sharing schedule associated with the TXOP that is selected according to the parameters provided by the one or more second APs.

In some implementations, the CAP schedule component 630 is capable of, configured to, or operable to support a means for updating the CAP sharing schedule associated with the TXOP in accordance with an indication that at least one of the one or more second APs does not intend to use the portion of the TXOP shared by the first AP.

In some implementations, the CAP schedule component 630 is capable of, configured to, or operable to support a means for scheduling the one or more second APs during the TXOP according to a traffic priority criterion of the one or more sharing criteria associated with the TXOP, where APs with high priority traffic are scheduled ahead of APs with low priority traffic.

In some implementations, the TXOP sharing component 635 is capable of, configured to, or operable to support a means for sharing, via the one or more second frames, the TXOP with at least one second AP of the one or more second APs, the at least one second AP having a pending traffic priority greater than or equal to a priority of an AC associated with the TXOP in accordance with the one or more sharing criteria.

In some implementations, to support transmitting the first frame, the CAP schedule component 630 is capable of, configured to, or operable to support a means for including one or more padding bits in the first frame in accordance with processing delays indicated by the parameters corresponding to the one or more second APs.

In some implementations, the frame exchange component 640 is capable of, configured to, or operable to support a means for performing a frame exchange with the one or more second APs in accordance with processing delays indicated by the parameters corresponding to the one or more second APs.

In some implementations, the indication of the parameters is received OTA or via respective backhaul links between the first AP and the one or more second APs. In some implementations, the one or more second frames indicate at least one second AP of the one or more second APs, a total duration of the TXOP, a minimum duration of the TXOP to be shared with the one or more second APs, traffic priority criteria associated with using the TXOP, carrier sensing criteria associated with using the TXOP, or a combination thereof.

In some implementations, the first frame further indicates whether APs excluded from the at least one second AP of the one or more second APs are to defer transmissions during the TXOP. In some implementations, the first frame further indicates an allocation of respective RUs to the one or more second APs.

In some implementations, the SA response component 645 is capable of, configured to, or operable to support a means for receiving, via at least one RU allocated by the first frame, a response indicating an availability or intent of the at least one second AP to participate in TXOP sharing with the first AP.

In some implementations, the trigger response component 650 is capable of, configured to, or operable to support a means for receiving a response to at least one triggering frame of the one or more second frames, the at least one triggering frame including an identifier of the at least one second AP of the one or more second APs. In some implementations, the TXOP sharing component 635 is capable of, configured to, or operable to support a means for sharing the portion of the TXOP with the at least one second AP in accordance with the response.

In some implementations, the response includes an identifier of the at least one second AP, a medium access demand of the at least one second AP, a priority of the medium access demand, a CAP mode requested by the at least one second AP, a processing time of the at least one second AP, or a combination thereof. In some implementations, the response is signaled via one or more of a TB-PPDU, a CTS frame, a variant of a CTS frame, a QoS NULL frame variant, or a management frame associated with CAP operations.

In some implementations, the TXOP sharing component 635 is capable of, configured to, or operable to support a means for performing one or both of a PIFS recovery procedure or a TXOP return process to recover the portion of the TXOP absent a response to the one or more second frames.

In some implementations, the TXOP sharing component 635 is capable of, configured to, or operable to support a means for sharing the portion of the TXOP with another AP of the one or more second APs or allocating the portion of the TXOP to the first AP in accordance with recovering the portion of the TXOP.

Additionally, or alternatively, the AP 620 (referred to hereinafter as a second AP) may support wireless communication in accordance with one or more aspects of the subject matter described in this disclosure. In some implementations, the parameter indication component 625 is capable of, configured to, or operable to support a means for transmitting an indication of parameters corresponding to the second AP associated with CAP operations, the parameters including one or more static capability parameters and one or more dynamic parameters corresponding to the second AP. In some implementations, the CAP schedule component 630 is capable of, configured to, or operable to support a means for receiving, in accordance with the parameters corresponding to the second AP, a first frame associated with a TXOP shared by a first AP, the first frame indicating one or more identifiers and one or more sharing criteria associated with the TXOP, the one or more identifiers including an identifier of the second AP. In some implementations, the TXOP sharing component 635 is capable of, configured to, or operable to support a means for receiving, in accordance with the first frame, a second frame associated with sharing at least a portion of the TXOP with the second AP.

In some implementations, to support transmitting the indication of the parameters, the parameter indication component 625 is capable of, configured to, or operable to support a means for transmitting an indication of a capability of the second AP to support C-TDMA, C-SR. C-OFDMA, or a combination thereof.

In some implementations, to support transmitting the indication of the parameters, the parameter indication component 625 is capable of, configured to, or operable to support a means for transmitting a message including the indication of the parameters corresponding to the second AP, where the message includes one or more of a broadcast, a unicast frame, a Beacon frame, a Beacon-A frame, or a dedicated management frame associated with CAP operations.

In some implementations, to support transmitting the indication of the parameters, the parameter indication component 625 is capable of, configured to, or operable to support a means for transmitting one or more of: one or more IEs associated with CAP operations that include the indication of the parameters corresponding to the second AP, or one or more fields in a UHR capability IE that include the indication of the parameters corresponding to the second AP.

In some implementations, the one or more static capability parameters indicate one or more of respective processing times or CAP modes supported by the second AP. In some implementations, the one or more dynamic parameters indicate one or more medium access demands, traffic priorities, or service period information associated with the second AP.

In some implementations, the one or more medium access demands and traffic priorities of the second AP are indicated per-TID or per-AC. In some implementations, the one or more medium access demands and traffic priorities are aggregated. In some implementations, the one or more medium access demands are signaled as octets, bandwidth-time units, a bitmap mapped to access categories, or binary indications.

In some implementations, to support receiving the first frame, the CAP schedule component 630 is capable of, configured to, or operable to support a means for receiving, via the first frame, an indication of a CAP sharing schedule associated with the TXOP that is selected according to the parameters provided by the second AP.

In some implementations, the frame exchange component 640 is capable of, configured to, or operable to support a means for performing a frame exchange with the first AP in accordance with processing delays indicated by the parameters corresponding to the second AP. In some implementations, the indication of the parameters is received OTA or via a backhaul link between the first AP and the second AP.

In some implementations, the second frame includes an identifier of the second AP, a total duration of the TXOP, a minimum duration of the TXOP to be shared with the second AP, traffic priority criteria associated with using the TXOP, carrier sensing criteria associated with using the TXOP, or a combination thereof.

In some implementations, the first frame further indicates whether APs excluded from the first frame are to defer transmissions during the TXOP. In some implementations, the first frame further indicates an allocation of at least one RU to the second AP.

In some implementations, the SA response component 645 is capable of, configured to, or operable to support a means for transmitting, via at least one RU allocated by the first frame, a response indicating an availability or intent of the second AP to participate in TXOP sharing with the first AP.

In some implementations, the second frame includes the one or more identifiers provided in the first frame. In some implementations, the trigger response component 650 is capable of, configured to, or operable to support a means for transmitting a response to the second frame, the second frame including an identifier of the second AP, the response including the identifier of the second AP, a medium access demand of the second AP, a priority of the medium access demand, a CAP mode requested by the second AP, a processing time of the second AP, or a combination thereof.

In some implementations, the response is signaled via one or more of a TB-PPDU, a CTS frame, a variant of a CTS frame, a QoS NULL frame variant, or a management frame associated with CAP operations.

FIG. 7 shows a flowchart illustrating an example process 700 performable at a first AP that supports information exchanges for CAP operations. The process 700 may be an example of a method implemented by a wireless AP or components thereof. For example, the process 700 may be performed by a wireless communication device, such as the wireless communication device 600 shown and described with reference to FIG. 6, operating as or within a wireless AP. In some implementations, the process 700 may be performed by a wireless AP, such as one of the APs 102 described with reference to FIG. 1.

In some implementations, at 705, the first AP may receive an indication of parameters corresponding to one or more second APs associated with CAP operations, the parameters including one or more static capability parameters and one or more dynamic parameters corresponding to each of the one or more second APs.

In some implementations, at 710, the first AP may transmit, in accordance with the parameters corresponding to the one or more second APs, a first frame associated with a TXOP shared by the first AP, the first frame indicating one or more identifiers corresponding to the one or more second APs and one or more sharing criteria associated with the TXOP.

In some implementations, at 715, the first AP may transmit, in accordance with the first frame, one or more second frames associated with sharing a portion of the TXOP with at least one second AP of the one or more second APs.

FIG. 8 shows a flowchart illustrating an example process 800 performable at a second AP that supports information exchanges for CAP operations according to some aspects of the present disclosure. The operations of the process 800 may be an example of a method implemented by a wireless AP or its components as described herein. For example, the process 800 may be performed by a wireless communication device, such as the wireless communication device 600 described with reference to FIG. 6, operating as or within a wireless AP. In some implementations, the process 800 may be performed by a wireless AP, such as one of the APs 102 described with reference to FIG. 1.

In some implementations, at 805, the second AP may transmit an indication of parameters corresponding to the second AP associated with CAP operations, the parameters including one or more static capability parameters and one or more dynamic parameters corresponding to the second AP.

In some implementations, at 810, the second AP may receive, in accordance with the parameters corresponding to the second AP, a first frame associated with a TXOP shared by a first AP, the first frame indicating one or more identifiers and one or more sharing criteria associated with the TXOP, the one or more identifiers including an identifier of the second AP.

In some implementations, at 815, the second AP may receive, in accordance with the first frame, a second frame associated with sharing at least a portion of the TXOP with the second AP.

Implementation examples are described in the following numbered clauses:

Clause 1: A first AP, including: one or more memories storing processor-executable code; and one or more processors coupled with the one or more memories and individually or collectively configured to, when executing the code, cause the first AP to: receive an indication of parameters corresponding to one or more second APs associated with CAP operations, the parameters including one or more static capability parameters and one or more dynamic parameters corresponding to each of the one or more second APs; transmit, in accordance with the parameters corresponding to the one or more second APs, a first frame associated with a TXOP shared by the first AP, the first frame indicating one or more identifiers corresponding to the one or more second APs and one or more sharing criteria associated with the TXOP; and transmit, in accordance with the first frame, one or more second frames associated with sharing a portion of the TXOP with at least one second AP of the one or more second APs.

Clause 2: The first AP of clause 1, where, to receive the indication of the parameters, the processor-executable code is configured to cause the first AP to receive an indication of respective capabilities of the one or more second APs to support C-TMDA, C-SR, C-OFDMA, or a combination thereof.

Clause 3: The first AP of any of clauses 1 through 2, where, to receive the indication of the parameters, the processor-executable code is configured to cause the first AP to receive a message including the indication of the parameters corresponding to the one or more second APs, where the message includes one or more of a broadcast, a unicast frame, a Beacon frame, a Beacon-A frame, or a dedicated management frame associated with CAP operations.

Clause 4: The first AP of any of clauses 1 through 3, where, to receive the indication of the parameters, the processor-executable code is configured to cause the first AP to receive one or more of: one or more IEs associated with CAP operations that include the indication of the parameters corresponding to the one or more second APs, or one or more fields in a UHR capability IE that include the indication of the parameters corresponding to the one or more second APs.

Clause 5: The first AP of any of clauses 1 through 4, where the one or more static capability parameters indicate one or more of respective processing times or CAP modes supported by the one or more second APs.

Clause 6: The first AP of any of clauses 1 through 5, where the one or more dynamic parameters indicate one or more of respective medium access demands, traffic priorities, or service period information associated with the one or more second APs.

Clause 7: The first AP of clause 6, where the portion of the TXOP is shared with the at least one second AP according to the service period information associated with the at least one second AP.

Clause 8: The first AP of any of clauses 6 through 7, where the respective medium access demands and traffic priorities are indicated per traffic identifier or per access category.

Clause 9: The first AP of any of clauses 6 through 8, where the respective medium access demands and traffic priorities are aggregated.

Clause 10: The first AP of any of clauses 6 through 9, where the respective medium access demands are signaled as octets, bandwidth-time units, a bitmap mapped to access categories, or binary indications.

Clause 11: The first AP of any of clauses 1 through 10, where, to transmit the first frame, the processor-executable code is configured to cause the first AP to transmit, via the first frame, an indication of a CAP sharing schedule associated with the TXOP that is selected according to the parameters provided by the one or more second APs.

Clause 12: The first AP of clause 11, where the processor-executable code is further configured to cause the first AP to update the CAP sharing schedule associated with the TXOP in accordance with an indication that at least one of the one or more second APs does not intend to use the portion of the TXOP shared by the first AP.

Clause 13: The first AP of any of clauses 1 through 12, where the processor-executable code is further configured to cause the first AP to schedule the one or more second APs during the TXOP according to a traffic priority criterion of the one or more sharing criteria associated with the TXOP, where APs with high priority traffic are scheduled ahead of APs with low priority traffic.

Clause 14: The first AP of any of clauses 1 through 13, where the processor-executable code is further configured to cause the first AP to sharing, via the one or more second frames, the TXOP with at least one second AP of the one or more second APs, the at least one second AP have a pending traffic priority greater than or equal to a priority of an access category associated with the TXOP in accordance with the one or more sharing criteria.

Clause 15: The first AP of any of clauses 1 through 14, where, to transmit the first frame, the processor-executable code is configured to cause the first AP to include one or more padding bits in the first frame in accordance with processing delays indicated by the parameters corresponding to the one or more second APs.

Clause 16: The first AP of any of clauses 1 through 15, where the processor-executable code is further configured to cause the first AP to perform a frame exchange with the one or more second APs in accordance with processing delays indicated by the parameters corresponding to the one or more second APs.

Clause 17: The first AP of any of clauses 1 through 16, where the indication of the parameters is received OTA or via respective backhaul links between the first AP and the one or more second APs.

Clause 18: The first AP of any of clauses 1 through 17, where the at least one second AP of the one or more second APs, a total duration of the TXOP, a minimum duration of the TXOP to be shared with the one or more second APs, traffic priority criteria associated with using the TXOP, carrier sensing criteria associated with using the TXOP, or a combination thereof.

Clause 19: The first AP of clause 18, where the first frame further indicates whether APs excluded from the at least one second AP of the one or more second APs are to defer transmissions during the TXOP.

Clause 20: The first AP of any of clauses 1 through 19, where the first frame further indicates an allocation of respective RUs to the one or more second APs.

Clause 21: The first AP of any of clauses 1 through 20, where the processor-executable code is further configured to cause the first AP to receive, via at least one RU allocated by the first frame, a response indicating an availability or intent of the at least one second AP to participate in TXOP sharing with the first AP.

Clause 22: The first AP of any of clauses 1 through 21, where the one or more second frames includes the one or more identifiers provided in the first frame.

Clause 23: The first AP of any of clauses 1 through 22, where the processor-executable code is further configured to cause the first AP to receive a response to at least one triggering frame of the one or more second frames, the at least one triggering frame including an identifier of the at least one second AP of the one or more second APs; and share the portion of the TXOP with the at least one second AP in accordance with the response.

Clause 24: The first AP of clause 23, where the response includes an identifier of the at least one second AP, a medium access demand of the at least one second AP, a priority of the medium access demand, a CAP mode requested by the at least one second AP, a processing time of the at least one second AP, or a combination thereof.

Clause 25: The first AP of any of clauses 23 through 24, where the response is signaled via one or more of a TB-PPDU, a CTS frame, a variant of a CTS frame, a QoS NULL frame variant, or a management frame associated with CAP operations.

Clause 26: The first AP of any of clauses 1 through 25, where the processor-executable code is further configured to cause the first AP to perform one or both of a PIFS recovery procedure or a TXOP return process to recover the portion of the TXOP absent a response to the one or more second frames.

Clause 27: The first AP of clause 26, where the processor-executable code is further configured to cause the first AP to share the portion of the TXOP with another AP of the one or more second APs or allocating the portion of the TXOP to the first AP in accordance with recovering the portion of the TXOP.

Clause 28: A second AP, including: one or more memories storing processor-executable code; and one or more processors coupled with the one or more memories and individually or collectively configured to, when executing the code, cause the second AP to: transmit an indication of parameters corresponding to the second AP associated with CAP operations, the parameters including one or more static capability parameters and one or more dynamic parameters corresponding to the second AP; receive, in accordance with the parameters corresponding to the second AP, a first frame associated with a TXOP shared by a first AP, the first frame indicating one or more identifiers and one or more sharing criteria associated with the TXOP, the one or more identifiers including an identifier of the second AP; and receive, in accordance with the first frame, a second frame associated with sharing at least a portion of the TXOP with the second AP.

Clause 29: The second AP of clause 28, where, to transmit the indication of the parameters, the processor-executable code is configured to cause the second AP to transmit an indication of a capability of the second AP to support C-TMDA, C-SR, C-OFDMA, or a combination thereof.

Clause 30: The second AP of any of clauses 28 through 29, where, to transmit the indication of the parameters, the processor-executable code is configured to cause the second AP to transmit a message including the indication of the parameters corresponding to the second AP, where the message includes one or more of a broadcast, a unicast frame, a Beacon frame, a Beacon-A frame, or a dedicated management frame associated with CAP operations.

Clause 31: The second AP of any of clauses 28 through 30, where, to transmit the indication of the parameters, the processor-executable code is configured to cause the second AP to transmit one or more of: one or more IEs associated with CAP operations that include the indication of the parameters corresponding to the second AP, or one or more fields in a UHR capability IE that include the indication of the parameters corresponding to the second AP.

Clause 32: The second AP of any of clauses 28 through 31, where the one or more static capability parameters indicate one or more of respective processing times or CAP modes supported by the second AP.

Clause 33: The second AP of any of clauses 28 through 32, where the one or more dynamic parameters indicate one or more medium access demands, traffic priorities, or service period information associated with the second AP.

Clause 34: The second AP of clause 33, where the one or more medium access demands and traffic priorities of the second AP are indicated per traffic identifier or per access category.

Clause 35: The second AP of any of clauses 33 through 34, where the one or more medium access demands and traffic priorities are aggregated.

Clause 36: The second AP of any of clauses 33 through 35, where the one or more medium access demands are signaled as octets, bandwidth-time units, a bitmap mapped to access categories, or binary indications.

Clause 37: The second AP of any of clauses 28 through 36, where, to receive the first frame, the processor-executable code is configured to cause the second AP to receive, via the first frame, an indication of a CAP sharing schedule associated with the TXOP that is selected according to the parameters provided by the second AP.

Clause 38: The second AP of any of clauses 28 through 37, where the processor-executable code is further configured to cause the second AP to perform a frame exchange with the first AP in accordance with processing delays indicated by the parameters corresponding to the second AP.

Clause 39: The second AP of any of clauses 28 through 38, where the indication of the parameters is received OTA or via a backhaul link between the first AP and the second AP.

Clause 40: The second AP of any of clauses 28 through 39, where an identifier of the second AP, a total duration of the TXOP, a minimum duration of the TXOP to be shared with the second AP, traffic priority criteria associated with using the TXOP, carrier sensing criteria associated with using the TXOP, or a combination thereof.

Clause 41: The second AP of clause 40, where the first frame further indicates whether APs excluded from the first frame are to defer transmissions during the TXOP.

Clause 42: The second AP of any of clauses 28 through 41, where the first frame further indicates an allocation of respective RUs to the second AP.

Clause 43: The second AP of any of clauses 28 through 42, where the processor-executable code is further configured to cause the second AP to transmit, via at least one RU allocated by the first frame, a response indicating an availability or intent of the second AP to participate in TXOP sharing with the first AP.

Clause 44: The second AP of any of clauses 28 through 43, where the second frame includes the one or more identifiers provided in the first frame.

Clause 45: The second AP of any of clauses 28 through 44, where the processor-executable code is further configured to cause the second AP to transmit a response to the second frame, the second frame including an identifier of the second AP, the response including the identifier of the second AP, a medium access demand of the second AP, a priority of the medium access demand, a CAP mode requested by the second AP, a processing time of the second AP, or a combination thereof.

Clause 46: The second AP of clause 45, where the response is signaled via one or more of a TB-PPDU, a CTS frame variant, a QoS NULL frame variant, or a management frame associated with CAP operations.

Clause 47: A method for wireless communication at a first AP, including: receiving an indication of parameters corresponding to one or more second APs associated with CAP operations, the parameters including one or more static capability parameters and one or more dynamic parameters corresponding to each of the one or more second APs; transmitting, in accordance with the parameters corresponding to the one or more second APs, a first frame associated with a TXOP shared by the first AP, the first frame indicating one or more identifiers corresponding to the one or more second APs and one or more sharing criteria associated with the TXOP; and transmitting, in accordance with the first frame, one or more second frames associated with sharing a portion of the TXOP with at least one second AP of the one or more second APs.

Clause 48: The method of clause 47, where receiving the indication of the parameters includes: receiving an indication of respective capabilities of the one or more second APs to support C-TMDA, C-SR, C-OFDMA, or a combination thereof.

Clause 49: The method of any of clauses 47 through 48, where receiving the indication of the parameters includes: receiving a message including the indication of the parameters corresponding to the one or more second APs, where the message includes one or more of a broadcast, a unicast frame, a Beacon frame, a Beacon-A frame, or a dedicated management frame associated with CAP operations.

Clause 50: The method of any of clauses 47 through 49, where receiving the indication of the parameters includes: receiving one or more of: one or more IEs associated with CAP operations that include the indication of the parameters corresponding to the one or more second APs, or one or more fields in a UHR capability IE that include the indication of the parameters corresponding to the one or more second APs.

Clause 51: The method of any of clauses 47 through 50, where the one or more static capability parameters indicate one or more of respective processing times or CAP modes supported by the one or more second APs.

Clause 52: The method of any of clauses 47 through 51, where the one or more dynamic parameters indicate one or more of respective medium access demands, traffic priorities, or service period information associated with the one or more second APs.

Clause 53: The method of clause 52, where the portion of the TXOP is shared with the at least one second AP according to the service period information associated with the at least one second AP.

Clause 54: The method of any of clauses 52 through 53, where the respective medium access demands and traffic priorities are indicated per traffic identifier or per access category.

Clause 55: The method of any of clauses 52 through 54, where the respective medium access demands and traffic priorities are aggregated.

Clause 56: The method of any of clauses 52 through 55, where the respective medium access demands are signaled as octets, bandwidth-time units, a bitmap mapped to access categories, or binary indications.

Clause 57: The method of any of clauses 47 through 56, where transmitting the first frame includes: transmitting, via the first frame, an indication of a CAP sharing schedule associated with the TXOP that is selected according to the parameters provided by the one or more second APs.

Clause 58: The method of clause 57, further including: updating the CAP sharing schedule associated with the TXOP in accordance with an indication that at least one of the one or more second APs does not intend to use the portion of the TXOP shared by the first AP.

Clause 59: The method of any of clauses 47 through 58, further including: scheduling the one or more second APs during the TXOP according to a traffic priority criterion of the one or more sharing criteria associated with the TXOP, where APs with high priority traffic are scheduled ahead of APs with low priority traffic.

Clause 60: The method of any of clauses 47 through 59, further including: sharing, via the one or more second frames, the TXOP with at least one second AP of the one or more second APs, the at least one second AP having a pending traffic priority greater than or equal to a priority of an access category associated with the TXOP in accordance with the one or more sharing criteria.

Clause 61: The method of any of clauses 47 through 60, where transmitting the first frame includes: including one or more padding bits in the first frame in accordance with processing delays indicated by the parameters corresponding to the one or more second APs.

Clause 62: The method of any of clauses 47 through 61, further including: performing a frame exchange with the one or more second APs in accordance with processing delays indicated by the parameters corresponding to the one or more second APs.

Clause 63: The method of any of clauses 47 through 62, where the indication of the parameters is received OTA or via respective backhaul links between the first AP and the one or more second APs.

Clause 64: The method of any of clauses 47 through 63, where the first frame indicates one or more of the at least one second AP of the one or more second APs, a total duration of the TXOP, a minimum duration of the TXOP to be shared with the one or more second APs, traffic priority criteria associated with using the TXOP, carrier sensing criteria associated with using the TXOP, or a combination thereof.

Clause 65: The method of clause 64, where the first frame further indicates whether APs excluded from the at least one second AP of the one or more second APs are to defer transmissions during the TXOP.

Clause 66: The method of any of clauses 47 through 65, where the first frame further indicates an allocation of respective RUs to the one or more second APs.

Clause 67: The method of any of clauses 47 through 66, further including: receiving, via at least one RU allocated by the first frame, a response indicating an availability or intent of the at least one second AP to participate in TXOP sharing with the first AP.

Clause 68: The method of any of clauses 47 through 67, where the one or more second frames includes the one or more identifiers provided in the first frame.

Clause 69: The method of any of clauses 47 through 68, further including: receiving a response to at least one triggering frame of the one or more second frames, the at least one triggering frame including an identifier of the at least one second AP of the one or more second APs; and sharing the portion of the TXOP with the at least one second AP in accordance with the response.

Clause 70: The method of clause 69, where the response includes an identifier of the at least one second AP, a medium access demand of the at least one second AP, a priority of the medium access demand, a CAP mode requested by the at least one second AP, a processing time of the at least one second AP, or a combination thereof.

Clause 71: The method of any of clauses 69 through 70, where the response is signaled via one or more of a TB-PPDU, a CTS frame, a variant of a CTS frame, a QoS NULL frame variant, or a management frame associated with CAP operations.

Clause 72: The method of any of clauses 47 through 71, further including: performing one or both of a PIFS recovery procedure or a TXOP return process to recover the portion of the TXOP absent a response to the one or more second frames.

Clause 73: The method of clause 72, further including: sharing the portion of the TXOP with another AP of the one or more second APs or allocating the portion of the TXOP to the first AP in accordance with recovering the portion of the TXOP.

Clause 74: A method for wireless communication at a second AP, including: transmitting an indication of parameters corresponding to the second AP associated with CAP operations, the parameters including one or more static capability parameters and one or more dynamic parameters corresponding to the second AP; receiving, in accordance with the parameters corresponding to the second AP, a first frame associated with a TXOP shared by a first AP, the first frame indicating one or more identifiers and one or more sharing criteria associated with the TXOP, the one or more identifiers including an identifier of the second AP; and receiving, in accordance with the first frame, a second frame associated with sharing at least a portion of the TXOP with the second AP.

Clause 75: The method of clause 74, where transmitting the indication of the parameters includes: transmitting an indication of a capability of the second AP to support C-TDMA, C-SR, C-OFDMA, or a combination thereof.

Clause 76: The method of any of clauses 74 through 75, where transmitting the indication of the parameters includes: transmitting a message including the indication of the parameters corresponding to the second AP, where the message includes one or more of a broadcast, a unicast frame, a Beacon frame, a Beacon-A frame, or a dedicated management frame associated with CAP operations.

Clause 77: The method of any of clauses 74 through 76, where transmitting the indication of the parameters includes: transmitting one or more of: one or more IEs associated with CAP operations that include the indication of the parameters corresponding to the second AP, or one or more fields in a UHR capability IE that include the indication of the parameters corresponding to the second AP.

Clause 78: The method of any of clauses 74 through 77, where the one or more static capability parameters indicate one or more of respective processing times or CAP modes supported by the second AP.

Clause 79: The method of any of clauses 74 through 78, where the one or more dynamic parameters indicate one or more medium access demands, traffic priorities, or service period information associated with the second AP.

Clause 80: The method of clause 79, where the one or more medium access demands and traffic priorities of the second AP are indicated per traffic identifier or per access category.

Clause 81: The method of any of clauses 79 through 80, where the one or more medium access demands and traffic priorities are aggregated.

Clause 82: The method of any of clauses 79 through 81, where the one or more medium access demands are signaled as octets, bandwidth-time units, a bitmap mapped to access categories, or binary indications.

Clause 83: The method of any of clauses 74 through 82, where receiving the first frame includes: receiving, via the first frame, an indication of a CAP sharing schedule associated with the TXOP that is selected according to the parameters provided by the second AP.

Clause 84: The method of any of clauses 74 through 83, further including: performing a frame exchange with the first AP in accordance with processing delays indicated by the parameters corresponding to the second AP.

Clause 85: The method of any of clauses 74 through 84, where the indication of the parameters is received OTA or via a backhaul link between the first AP and the second AP.

Clause 86: The method of any of clauses 74 through 85, where the first frame indicates one or more of an identifier of the second AP, a total duration of the TXOP, a minimum duration of the TXOP to be shared with the second AP, traffic priority criteria associated with using the TXOP, carrier sensing criteria associated with using the TXOP, or a combination thereof.

Clause 87: The method of clause 86, where the first frame further indicates whether APs excluded from the first frame are to defer transmissions during the TXOP.

Clause 88: The method of any of clauses 74 through 87, where the first frame further indicates an allocation of respective RUs to the second AP.

Clause 89: The method of any of clauses 74 through 88, further including: transmitting, via at least one RU allocated by the first frame, a response indicating an availability or intent of the second AP to participate in TXOP sharing with the first AP.

Clause 90: The method of any of clauses 74 through 89, where the second frame includes the one or more identifiers provided in the first frame.

Clause 91: The method of any of clauses 74 through 90, further including: transmitting a response to the second frame, the second frame including an identifier of the second AP, the response including the identifier of the second AP, a medium access demand of the second AP, a priority of the medium access demand, a CAP mode requested by the second AP, a processing time of the second AP, or a combination thereof.

Clause 92: The method of clause 91, where the response is signaled via one or more of a TB-PPDU, a CTS frame variant, a QoS NULL frame variant, or a management frame associated with CAP operations.

Clause 93: A computer program including instructions that, when executed by at least one processor, cause the at least one processor to perform a method of any one of clauses 47-73.

Clause 94: A computer program including instructions that, when executed on at least one processor, cause the at least one processor to perform a method of any one of clauses 74-92.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "associated with" is intended to be interpreted in the inclusive sense, unless otherwise explicitly indicated. For example, "associated with" may be used interchangeably with "based at least in part on," "associated with", or "in accordance with" unless otherwise explicitly indicated. Specifically, unless a phrase refers to "associated with only 'a,'" or the equivalent in context, whatever it is that is "associated with 'a,'" or "based at least in part on 'a,'" may be associated with "a" alone or associated with a combination of "a" and one or more other factors, conditions or information.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some implementations be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A first access point (AP), comprising:

one or more memories storing processor-executable code; and one or more processors coupled with the one or more memories and individually or collectively configured to, when executing the code, cause the first AP to:

receive an indication of parameters corresponding to one or more second APs associated with coordinated AP operations, the parameters including at least one of one or more static capability parameters or one or more dynamic parameters corresponding to each of the one or more second APs;

transmit, in accordance with the parameters corresponding to the one or more second APs, a first frame associated with a transmit opportunity (TXOP) shared by the first AP, the first frame indicating one or more identifiers corresponding to the one or more second APs and one or more sharing criteria associated with the TXOP; and transmit, in accordance with the first frame, one or more second frames associated with sharing a portion of the TXOP with at least one second AP of the one or more second APs.

2. The first AP of claim 1, wherein, to receive the indication of the parameters, the processor-executable code is configured to cause the first AP to:

receive an indication of respective capabilities of the one or more second APs to support at least one of coordinated time division multiple access (TDMA), coordinated spatial reuse, coordinated orthogonal frequency division multiple access (OFDMA), or a combination thereof.

3. The first AP of claim 1, wherein, to receive the indication of the parameters, the processor-executable code is configured to cause the first AP to:

receive a message including the indication of the parameters corresponding to the one or more second APs, wherein the message includes one or more of a broadcast frame, a unicast frame, a Beacon frame, a Beacon-A frame, or a dedicated management frame associated with coordinated AP operations.

4. The first AP of claim 1, wherein, to receive the indication of the parameters, the processor-executable code is configured to cause the first AP to:

receive one or more of:

one or more information elements (IEs) associated with coordinated AP operations that include the indication of the parameters corresponding to the one or more second APs, or one or more fields in an ultra-high-reliability (UHR) capability IE that include the indication of the parameters corresponding to the one or more second APs.

5. The first AP of claim 1, wherein the one or more static capability parameters indicate one or more of respective processing times or coordinated AP modes supported by the one or more second APs.

6. The first AP of claim 1, wherein the one or more dynamic parameters indicate one or more of respective medium access demands, traffic priorities, or service period information associated with the one or more second APs.

7. The first AP of claim 1, wherein, to transmit the first frame, the processor-executable code is configured to cause the first AP to:

transmit, via the first frame, an indication of a coordinated AP sharing schedule associated with the TXOP that is selected according to the parameters provided by the one or more second APs.

8. The first AP of claim 1, wherein the processor-executable code is further configured to cause the first AP to:

schedule the one or more second APs during the TXOP according to a traffic priority criterion of the one or more sharing criteria associated with the TXOP, wherein APs with high priority traffic are scheduled ahead of APs with low priority traffic.

9. The first AP of claim 1, wherein the processor-executable code is further configured to cause the first AP to:

sharing, via the one or more second frames, the TXOP with at least one second AP of the one or more second APs, the at least one second AP have a pending traffic priority greater than or equal to a priority of an access category associated with the TXOP in accordance with the one or more sharing criteria.

10. The first AP of claim 1, wherein, to transmit the first frame, the processor-executable code is configured to cause the first AP to:

include one or more padding bits in the first frame in accordance with processing delays indicated by the parameters corresponding to the one or more second APs.

11. The first AP of claim 1, wherein the processor-executable code is further configured to cause the first AP to:

perform a frame exchange with the one or more second APs in accordance with processing delays indicated by the parameters corresponding to the one or more second APs.

12. The first AP of claim 1, wherein the indication of the parameters is received over-the-air (OTA) or via respective backhaul links between the first AP and the one or more second APs.

13. The first AP of claim 1, wherein the at least one second AP of the one or more second APs, a total duration of the TXOP, a minimum duration of the TXOP to be shared with the one or more second APs, traffic priority criteria associated with using the TXOP, carrier sensing criteria associated with using the TXOP, or a combination thereof.

14. The first AP of claim 1, wherein the processor-executable code is further configured to cause the first AP to:

receive, via at least one resource unit (RU) allocated by the first frame, a response indicating an availability or intent of the at least one second AP to participate in TXOP sharing with the first AP.

15. The first AP of claim 1, wherein the one or more second frames includes the one or more identifiers provided in the first frame.

16. The first AP of claim 1, wherein the processor-executable code is further configured to cause the first AP to:

receive a response to at least one triggering frame of the one or more second frames, the at least one triggering frame comprising an identifier of the at least one second AP of the one or more second APs; and share the portion of the TXOP with the at least one second AP in accordance with the response.

17. The first AP of claim 16, wherein the response is signaled via one or more of a trigger-based physical layer (PHY) protocol data unit (PPDU), a clear to send (CTS) frame, a variant of a CTS frame, a quality of service (QoS) NULL frame variant, or a management frame associated with coordinated AP operations.

18. The first AP of claim 1, wherein the processor-executable code is further configured to cause the first AP to:

perform one or both of a point coordination function (PCF) interframe space (PIFS) recovery procedure or a TXOP return process to recover the portion of the TXOP absent a response to the one or more second frames.

19. A second access point (AP), comprising:
one or more memories storing processor-executable code; and
one or more processors coupled with the one or more memories and individually or collectively configured to, when executing the code, cause the second AP to:
  transmit an indication of parameters corresponding to the second AP associated with coordinated AP operations, the parameters including at least one of one or more static capability parameters or one or more dynamic parameters corresponding to the second AP;
  receive, in accordance with the parameters corresponding to the second AP, a first frame associated with a transmit opportunity (TXOP) shared by a first AP, the first frame indicating one or more identifiers and one or more sharing criteria associated with the TXOP, the one or more identifiers comprising an identifier of the second AP; and
  receive, in accordance with the first frame, a second frame associated with sharing at least a portion of the TXOP with the second AP.

20. The second AP of claim 19, wherein, to transmit the indication of the parameters, the processor-executable code is configured to cause the second AP to:
  transmit an indication of a capability of the second AP to support at least one of coordinated time division multiple access (TDMA), coordinated spatial reuse, coordinated orthogonal frequency division multiple access (OFDMA), or a combination thereof.

21. The second AP of claim 19, wherein, to transmit the indication of the parameters, the processor-executable code is configured to cause the second AP to:
  transmit a message including the indication of the parameters corresponding to the second AP, wherein the message includes one or more of a broadcast frame, a unicast frame, a Beacon frame, a Beacon-A frame, or a dedicated management frame associated with coordinated AP operations.

22. The second AP of claim 19, wherein, to transmit the indication of the parameters, the processor-executable code is configured to cause the second AP to:
  transmit one or more of:
    one or more information elements (IEs) associated with coordinated AP operations that include the indication of the parameters corresponding to the second AP, or
    one or more fields in an ultra-high-reliability (UHR) capability IE that include the indication of the parameters corresponding to the second AP.

23. The second AP of claim 19, wherein the one or more static capability parameters indicate one or more of respective processing times or coordinated AP modes supported by the second AP.

24. The second AP of claim 19, wherein the one or more dynamic parameters indicate one or more medium access demands, traffic priorities, or service period information associated with the second AP.

25. A method for wireless communication at a first access point (AP), comprising:
  receiving an indication of parameters corresponding to one or more second APs associated with coordinated AP operations, the parameters including at least one of one or more static capability parameters or one or more dynamic parameters corresponding to each of the one or more second APs;
  transmitting, in accordance with the parameters corresponding to the one or more second APs, a first frame associated with a transmit opportunity (TXOP) shared by the first AP, the first frame indicating one or more identifiers corresponding to the one or more second APs and one or more sharing criteria associated with the TXOP; and
  transmitting, in accordance with the first frame, one or more second frames associated with sharing a portion of the TXOP with at least one second AP of the one or more second APs.

26. The method of claim 25, further comprising:
  scheduling the one or more second APs during the TXOP according to a traffic priority criterion of the one or more sharing criteria associated with the TXOP, wherein APs with high priority traffic are scheduled ahead of APs with low priority traffic.

27. The method of claim 25, further comprising:
  sharing, via the one or more second frames, the TXOP with at least one second AP of the one or more second APs, the at least one second AP having a pending traffic priority greater than or equal to a priority of an access category associated with the TXOP in accordance with the one or more sharing criteria.

28. The method of claim 25, further comprising:
  receiving an indication of respective capabilities of the one or more second APs to support at least one of coordinated time division multiple access (TDMA), coordinated spatial reuse, coordinated orthogonal frequency division multiple access (OFDMA), or a combination thereof.

29. The method of claim 25, further comprising:
  receiving a message including the indication of the parameters corresponding to the one or more second APs, wherein the message includes one or more of a broadcast frame, a unicast frame, or a dedicated management frame associated with coordinated AP operations.

30. The method of claim 25, further comprising:
  receiving one or more of:
    one or more information elements (IEs) associated with coordinated AP operations that include the indication of the parameters corresponding to the one or more second APs, or
    one or more fields in an ultra-high-reliability (UHR) capability IE that include the indication of the parameters corresponding to the one or more second APs.

31. The method of claim 25, wherein the one or more static capability parameters indicate one or more of respective processing times or coordinated AP modes supported by the one or more second APs.

32. A method for wireless communication at a second access point (AP), comprising:
  transmitting an indication of parameters corresponding to the second AP associated with coordinated AP operations, the parameters including at least one of one or more static capability parameters or one or more dynamic parameters corresponding to the second AP;
  receiving, in accordance with the parameters corresponding to the second AP, a first frame associated with a transmit opportunity (TXOP) shared by a first AP, the first frame indicating one or more identifiers and one or more sharing criteria associated with the TXOP, the one or more identifiers comprising an identifier of the second AP; and receiving, in accordance with the first frame, a second frame associated with sharing at least a portion of the TXOP with the second AP.

33. The method of claim 32, wherein receiving the first frame comprises:

receiving, via the first frame, an indication of a coordinated AP sharing schedule associated with the TXOP that is selected according to the parameters provided by the second AP.

34. The method of claim 32, further comprising:

performing a frame exchange with the first AP in accordance with processing delays indicated by the parameters corresponding to the second AP, wherein the frame exchange is performed prior to transmissions of the first AP in the TXOP.

35. The method of claim 32, further comprising:

transmitting an indication of a capability of the second AP to support at least one of coordinated time division multiple access (TDMA), coordinated spatial reuse, coordinated orthogonal frequency division multiple access (OFDMA), or a combination thereof.

36. The method of claim 32, further comprising:

transmitting a message including the indication of the parameters corresponding to the second AP, wherein the message includes one or more of a broadcast frame, a unicast frame, or a dedicated management frame associated with coordinated AP operations.

37. The method of claim 32, further comprising:

transmitting one or more of:

one or more information elements (IEs) associated with coordinated AP operations that include the indication of the parameters corresponding to the second AP, or one or more fields in an ultra-high-reliability (UHR) capability IE that include the indication of the parameters corresponding to the second AP.

38. The method of claim 32, wherein the one or more static capability parameters indicate one or more of respective processing times or coordinated AP modes supported by the second AP.

* * * * *